(12) United States Patent
Tan et al.

(10) Patent No.: US 12,359,095 B2
(45) Date of Patent: Jul. 15, 2025

(54) ADHESIVE ASSEMBLIES PERMITTING ENHANCED WEIGHT BEARING PERFORMANCE WITH DAMAGE FREE REMOVAL

(71) Applicant: 3M INNOVATIVE PROPERTIES COMPANY, St. Paul, MN (US)

(72) Inventors: Dawud H. Tan, Lakeland, MN (US); Brett P. Krull, Saint Anthony, MN (US); Margaret M. Sheridan, Woodbury, MN (US); Bradley S. Forney, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 165 days.

(21) Appl. No.: 18/248,883

(22) PCT Filed: Oct. 8, 2021

(86) PCT No.: PCT/IB2021/059241
§ 371 (c)(1),
(2) Date: Apr. 13, 2023

(87) PCT Pub. No.: WO2022/079557
PCT Pub. Date: Apr. 21, 2022

(65) Prior Publication Data
US 2023/0392051 A1    Dec. 7, 2023

Related U.S. Application Data

(60) Provisional application No. 63/092,348, filed on Oct. 15, 2020.

(51) Int. Cl.
*C09J 7/29* (2018.01)
*C09J 121/00* (2006.01)
*C09J 133/08* (2006.01)

(52) U.S. Cl.
CPC ............... *C09J 7/29* (2018.01); *C09J 121/00* (2013.01); *C09J 133/08* (2013.01);
(Continued)

(58) Field of Classification Search
CPC ............ C09J 2301/302; C09J 2301/124; C09J 2301/50; C09J 133/08; C09J 121/00; C09J 7/29
See application file for complete search history.

(56) References Cited

U.S. PATENT DOCUMENTS

| | | | |
|---|---|---|---|
| 2,464,301 | A | 3/1949 | Francis, Jr. |
| 3,507,943 | A | 4/1970 | Such et al. |

(Continued)

FOREIGN PATENT DOCUMENTS

| | | |
|---|---|---|
| WO | 2015035556 A1 | 3/2015 |
| WO | 2015035960 A1 | 3/2015 |

(Continued)

OTHER PUBLICATIONS

Davies, "The Separation of Airborne Dust and Particles", Proceedings of the Institution of Mechanical Engineers, Jun. 1953, vol. 167, No. 1B, pp. 185-213.
(Continued)

*Primary Examiner* — Vishal I Patel

(57) ABSTRACT

The present disclosure provides an adhesive assemblies such as an adhesive assembly for mounting an object to a surface, the assembly comprising: a first adhesive construction including a first major surface and a second major surface, the first adhesive construction including a first adhesive layer, a first core adjacent to the first adhesive layer, the core comprising core material and including first and second major surfaces; and a first arranged pattern of recesses on at least the first major surface of the first core, each recess terminating in a membrane, wherein the membrane is
(Continued)

defined by a bottom surface of the recess and comprises core material; and a first adhesive interface at the bottom surface or within the membrane; and a stiffening carrier laminated to the second major surface of the first adhesive construction, the stiffening carrier having a higher stiffness than the first adhesive construction.

14 Claims, 7 Drawing Sheets

(52) U.S. Cl.
CPC .... *C09J 2301/124* (2020.08); *C09J 2301/302* (2020.08); *C09J 2301/50* (2020.08)

(56) References Cited

U.S. PATENT DOCUMENTS

| | | | |
|---|---|---|---|
| 3,737,368 | A | 6/1973 | Such et al. |
| 3,802,817 | A | 4/1974 | Matsuki et al. |
| 3,844,869 | A | 10/1974 | Rust, Jr. |
| 4,259,399 | A | 3/1981 | Hill |
| 4,472,480 | A | 9/1984 | Olson |
| 4,640,810 | A | 2/1987 | Laursen et al. |
| 4,726,982 | A | 2/1988 | Traynor et al. |
| 4,736,048 | A | 4/1988 | Brown et al. |
| 4,980,443 | A | 12/1990 | Kendziorski et al. |
| 5,082,706 | A | 1/1992 | Tangney |
| 5,096,532 | A | 3/1992 | Neuwirth et al. |
| 5,110,403 | A | 5/1992 | Ehlert |
| 5,114,787 | A | 5/1992 | Chaplin et al. |
| 5,167,765 | A | 12/1992 | Nielsen et al. |
| 5,256,231 | A | 10/1993 | Gorman et al. |
| 5,277,976 | A | 1/1994 | Hogle et al. |
| 5,354,597 | A | 10/1994 | Capik et al. |
| 5,409,189 | A | 4/1995 | Luhmann |
| 5,507,464 | A | 4/1996 | Hamerski et al. |
| 5,643,397 | A | 7/1997 | Gorman et al. |
| 5,817,199 | A | 10/1998 | Brennecke et al. |
| 5,965,256 | A | 10/1999 | Barrera |
| 5,967,474 | A | 10/1999 | Docanto et al. |
| 5,976,316 | A | 11/1999 | Mlinar et al. |
| 5,989,708 | A | 11/1999 | Kreckel |
| 6,001,471 | A | 12/1999 | Bries et al. |
| 6,082,686 | A | 7/2000 | Schumann |
| 6,131,864 | A | 10/2000 | Schumann |
| 6,383,958 | B1 | 5/2002 | Swanson et al. |
| 6,569,521 | B1 | 5/2003 | Sheridan et al. |
| 6,607,624 | B2 | 8/2003 | Berrigan et al. |
| 6,730,397 | B2 | 5/2004 | Melancon et al. |
| 6,811,126 | B2 | 11/2004 | Johansson et al. |
| 7,028,958 | B2 | 4/2006 | Pitzen et al. |
| 7,690,548 | B2 | 4/2010 | Mlinar et al. |
| D665,653 | S | 8/2012 | Thompson et al. |
| D670,997 | S | 11/2012 | Thompson et al. |
| 8,530,021 | B2 | 9/2013 | Bartusiak et al. |
| 8,708,305 | B2 | 4/2014 | McGreevy et al. |
| 9,139,940 | B2 | 9/2015 | Berrigan et al. |
| 9,469,091 | B2 | 10/2016 | Henke et al. |
| D876,935 | S | 3/2020 | Krull et al. |
| 2005/0137375 | A1 | 6/2005 | Hansen et al. |
| 2011/0300361 | A1 | 12/2011 | Nakayama et al. |
| 2013/0189507 | A1 | 7/2013 | Yamamoto et al. |
| 2014/0335299 | A1 | 11/2014 | Wang et al. |
| 2015/0034104 | A1 | 2/2015 | Zhou et al. |
| 2015/0225612 | A1 | 8/2015 | Ebenau et al. |
| 2017/0089377 | A1 | 3/2017 | Runge et al. |
| 2019/0002737 | A1 | 1/2019 | Runge et al. |
| 2019/0048233 | A1 | 2/2019 | Cowman-Eggert et al. |
| 2019/0085215 | A1 | 3/2019 | Uemura et al. |
| 2020/0124230 | A1 | 4/2020 | Hoffman et al. |
| 2020/0190365 | A1 | 6/2020 | Krull et al. |
| 2020/0224060 | A1 | 7/2020 | Krull et al. |
| 2020/0317964 | A1* | 10/2020 | Inagaki .................. B32B 7/12 |

FOREIGN PATENT DOCUMENTS

| | | | |
|---|---|---|---|
| WO | 2015195344 A1 | 12/2015 | |
| WO | 2017136188 A1 | 8/2017 | |
| WO | 2017136219 A1 | 8/2017 | |
| WO | 2018144331 A1 | 8/2018 | |
| WO | 2018183195 A1 | 10/2018 | |
| WO | 2019005831 A1 | 1/2019 | |
| WO | 2019026510 A1 | 2/2019 | |
| WO | 2019040862 A1 | 2/2019 | |
| WO | WO-2019040820 A1 * | 2/2019 | ........... B32B 15/046 |
| WO | 2021176290 A1 | 9/2021 | |

OTHER PUBLICATIONS

Encyclopedia of Polymer Science and Engineering, Wiley-Interscience Publishers, 1988, vol. 13, Table of contents, 3 pages.
Herman, Encyclopedia of Polymer Science and Technology, vol. 1—Ablative Polymers to Amino Acids, Table of Contents, 2 Pages, (1964).
International Search Report for PCT International Application No. PCT/IB2021/059241, mailed on Nov. 22, 2021, 6 pages.
Extended European Search Report for PCT International Application No. PCT/IB2021/059241, mailed on Sep. 4, 2024, 6 pages.

* cited by examiner

ADHESIVE ASSEMBLIES PERMITTING ENHANCED WEIGHT BEARING PERFORMANCE WITH DAMAGE FREE REMOVAL

TECHNICAL FIELD

The present disclosure generally relates to peelable adhesive assemblies that are capable of attaching or adhering to a substrate and that can be removed from the substrate without causing damage to the substrate. The present disclosure also generally relates to methods of making and using such adhesive assemblies.

BACKGROUND & SUMMARY

Existing peelable adhesive mounting products occasionally do not work well on various surfaces, including, for example, fluorinated surfaces, paper, and certain rough surfaces (e.g., drywall). Performance, in terms of adhesion and shear strength, may also suffer in high humidity (≥70% RH at ~72° F.) environments. Additionally, the existing products can exhibit limited shear strength and thus can hold relatively lighter weights (e.g., less than 2 lbs). As such, the inventors of the present disclosure sought to formulate peelable mounting products and/or adhesive assemblies with at least one of higher shear strength, ability to work well on a myriad of surfaces, and/or that are capable of consistently holding higher weights, all without damaging the substrate to which they are applied.

The inventors of the present disclosure recognized that the existing peel release adhesive products could be improved or enhanced by including additional stiffening and/or backing elements to create a multi-layer composite assembly. In some instances, this can be accomplished by including a stiffening carrier material between two peelable nonwoven adhesive constructions. In other instances, the above benefits can be achieved with a single peelable nonwoven adhesive construction coupled to a carrier. The nonwoven adhesive construction can be directly laminated to the carrier backing or may be fixed via a distinct carrier adhesive layer. By distributing the desirable weight bearing and peel removal properties amongst components of an exterior adhesive construction and a stiffening carrier, the adhesive assemblies of the present disclosure can capitalize on myriad carrier backing materials and constructions without deleteriously impacting damage free removability. In some instances, the enhanced construction allows the adhesive assemblies to hold more weight. In some embodiments, the enhanced performance permits the adhesive assemblies to be used on new surfaces (e.g., delicate paper). In some embodiments, the enhanced weight bearing capacity per unit area increases or enhances the product performance on certain surfaces (e.g., paper, hardgood, or fluorinated paint).

In one aspect, the present disclosure provides an adhesive assembly for mounting an object to a surface, the assembly comprising: a first adhesive construction including a first major surface and a second major surface, the first adhesive construction including a first adhesive layer; a first core adjacent the first adhesive layer, the core comprising core material and including first and second major surfaces; and a first arranged pattern of recesses on at least the first major surface of the first core, each recess terminating in a membrane, wherein the membrane is defined by the bottom surface of the recess and comprises core material; and a stiffening carrier laminated to the second major surface of the first adhesive construction, the stiffening carrier having a higher stiffness than the first adhesive construction.

In another aspect, the present disclosure provides a method for making an adhesive article, the method comprising providing a first adhesive construction including a first major surface and a second major surface, the first adhesive construction including a first adhesive layer; a first core adjacent the first adhesive layer, the core comprising core material and including first and second major surfaces; and a first arranged pattern of recesses on at least the first major surface of the first core, each recess terminating in a membrane, wherein the membrane is defined by the bottom surface of the recess and comprises core material; and a first adhesive interface at the bottom surface or within the membrane. The method further includes providing a stiffening carrier, the first carrier adhesive layer laminated to the second major surface of the first adhesive construction and laminating the carrier to the second major surface of the first adhesive construction.

In another aspect, the present disclosure provides an adhesive assembly comprising a composite adhesive article comprising, a first adhesive construction including a first major surface and a second major surface, the first adhesive construction including a first adhesive layer; a first core adjacent the first adhesive layer, the core comprising core material and including first and second major surfaces. The first adhesive construction includes a first arranged pattern of recesses on at least the first major surface of the first core, each recess terminating in a membrane, wherein the membrane is defined by the bottom surface of the recess and comprises core material; and a first adhesive interface at the bottom surface or within the membrane; and a stiffening carrier having a higher stiffness than the first adhesive construction, the carrier laminated to the second major surface of the first adhesive construction and a hardgood mounting device coupled to the carrier opposite the first adhesive construction.

In yet another aspect, the present disclosure provides an adhesive assembly for mounting an object to a surface, the assembly comprising: a first exterior adhesive construction including a first major surface and a second major surface, the first adhesive construction including a first adhesive layer; a first core adjacent the first adhesive layer, the core comprising core material and including first and second major surfaces; and a first arranged pattern of recesses on at least the first major surface of the first core, each recess terminating in a membrane, wherein the membrane is defined by the bottom surface of the recess and comprises core material; and a first adhesive interface at the bottom surface or within the membrane; a carrier including a first carrier adhesive layer, a second carrier adhesive layer, and a stiffening layer including opposing major surfaces, the first carrier adhesive layer laminated to the second major surface of the first adhesive construction and the first major surface of the stiffening layer; and a second exterior adhesive construction adjacent the second major surface of the carrier, the second adhesive construction including opposing major surfaces the second adhesive construction including a second adhesive layer; a second core adjacent the second adhesive layer, the second core comprising core material and including opposing major surfaces; and a second arranged pattern of recesses on at least the second major surface of the second core, each recess terminating in a membrane, wherein the membrane is defined by the bottom surface of the recess and comprises core material; and a second adhesive interface at the bottom surface or within the membrane, wherein the first and second exterior adhesive constructions reside on opposing sides of the carrier.

As used herein, "porosity" means a measure of void spaces in a material. Size, frequency, number, and/or interconnectivity of pores and voids contribute the porosity of a material.

As used herein, "void volume" means a percentage or fractional value for the unfilled space within a porous or fibrous body, such as a web or filter, which may be calculated by measuring the weight and volume of a web or filter, then comparing the weight to the theoretical weight of a solid mass of the same constituent material of that same volume.

As used herein, "Solidity" describes a dimensionless fraction (usually reported in percent) that represents the proportion of the total volume of a nonwoven web that is occupied by the solid (e.g., polymeric filament) material. Loft is 100% minus Solidity and represents the proportion of the total volume of the web that is unoccupied by solid material.

As used herein, "layer" means a single stratum that may be continuous or discontinuous over a surface.

As used herein, the terms, "height", "depth", "top" and "bottom" are for illustrative purposes only, and do not necessarily define the orientation or the relationship between the surface and the intrusive feature. Accordingly, the terms "height" and "depth", as well as "top" and "bottom" should be considered interchangeable.

The terms "comprises" and variations thereof do not have a limiting meaning where these terms appear in the description and claims The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As recited herein, all numbers should be considered modified by the term "about".

As used herein, "a", "an", "the", "at least one", and "one or more" are used interchangeably. Thus, for example, a core comprising "a" pattern of recesses can be interpreted as a core comprising "one or more" patterns.

Also herein, the recitations of numerical ranges by endpoints include all numbers subsumed within that range (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exhaustive list.

Figure 1:
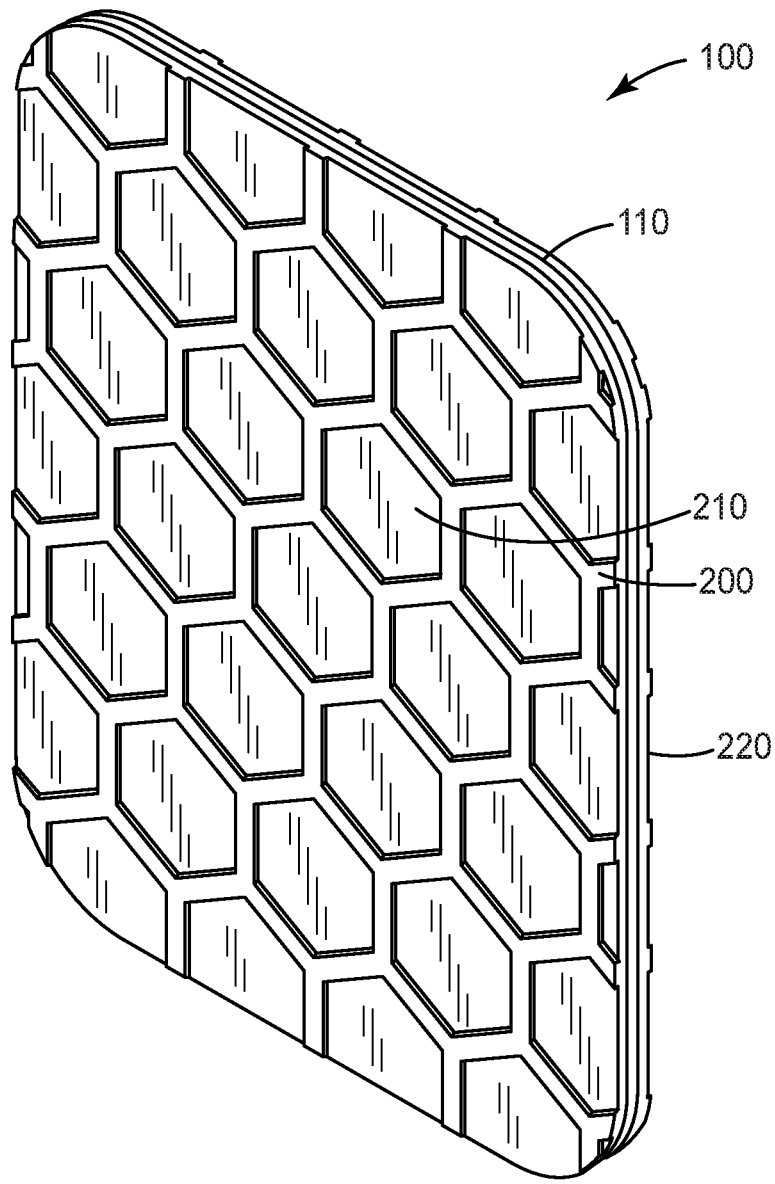
FIG. 1 is a perspective view of one embodiment of an exemplary, multicomponent adhesive assembly of the type generally described herein.

Layers in certain depicted embodiments are for illustrative purposes only and are not intended to absolutely define the thickness, relative or otherwise, or the absolute location of any component. While the above-identified figures set forth several embodiments of the disclosure other embodiments are also contemplated, as noted in the description. In all cases, this disclosure is presented by way of representation and not limitation It should be understood that numerous other modifications and embodiments can be devised by those skilled in the art, which fall within the scope and spirit of the principles of the disclosure.

DETAILED DESCRIPTION

Various embodiments and implementations will be described in detail. These embodiments should not be construed as limiting the scope of the present application in any manner, and changes and modifications may be made without departing from the spirit and scope of the inventions. Further, only some end uses have been discussed herein, but end uses not specifically described herein are included within the scope of the present application. As such, the scope of the present application should be determined by the claims The present disclosure generally relates to adhesive assemblies that can be removed from a substrate, wall, or surface (generally, an adherend) without damage. As used herein, the terms "without damage" and "damage-free" or the like means the adhesive article can be separated from the substrate without causing visible damage to paints, coatings, resins, coverings, or the underlying substrate and/or leaving behind residue. Visible damage to the substrates can be in the form of, for example, scratching, tearing, delaminating, breaking, crumbling, straining, and the like to any layers of the substrate. Visible damage can also be discoloration, weakening, changes in gloss, changes in haze, or other changes in appearance of the substrate.

Prior attempts to provide damage free adhesive articles, such as those described in US 2020/0190365 (Krull et al.), succeeded on the promise of damage free removal on a wide variety of surfaces, including drywall. Despite the considerable leaps forward in peel release technology, some of these constructions did not routinely hold higher weight objects for an appreciable amount of time. Moreover, the constructions occasionally lost adhesion to the mounting surface prematurely when used without hardgoods. The present inventors realized an opportunity to advance peel release technology by enhancing the adhesion and hold without sacrificing the promise of damage-free removal.

The adhesive assemblies of the present disclosure include (1) one or more exterior, peelable adhesive constructions secured to (2) a stiffening carrier. As used herein, the term "peelable" means that the adhesive article can be removed from a substrate or surface by peeling at angle of between about 1° and about 180°. In some embodiments, the adhesive article can be removed from a substrate or surface by peeling at angle of between 30° to 120°. In some embodiments, the adhesive article can be removed from a substrate or surface by peeling at angle of at least about 35°.

During peel release removal, specified regions of the exterior peelable adhesive constructions undergo delamination or localized internal destruction, preventing force from easily transferring to the adherend from the load introduced during peel removal. The adhesive articles are thus specifically designed to mimic a "backingless" construction on adjacent the outermost surface, where any backing material has little to no contribution to adhesive removal forces experienced by the adherend. This advantageous "backingless" behavior on the exterior can be combined with a stiffening carrier to improve the shear strength and stability of the resulting adhesive assembly without dramatically impacting the desirable, damage-free removal.

Figure 2:
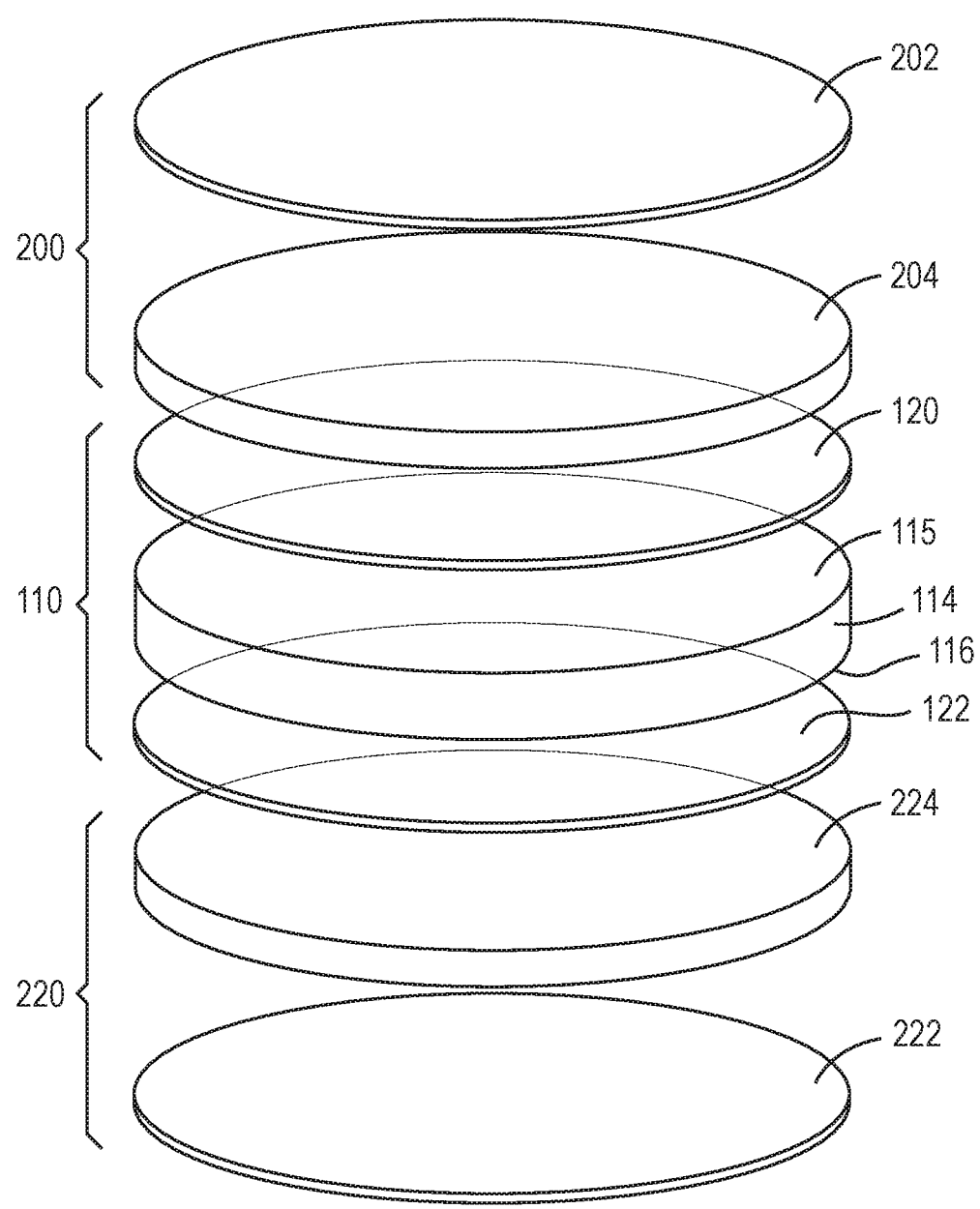
FIG. 2 is an exploded view of the adhesive assembly of FIG. 1
Figure 3:
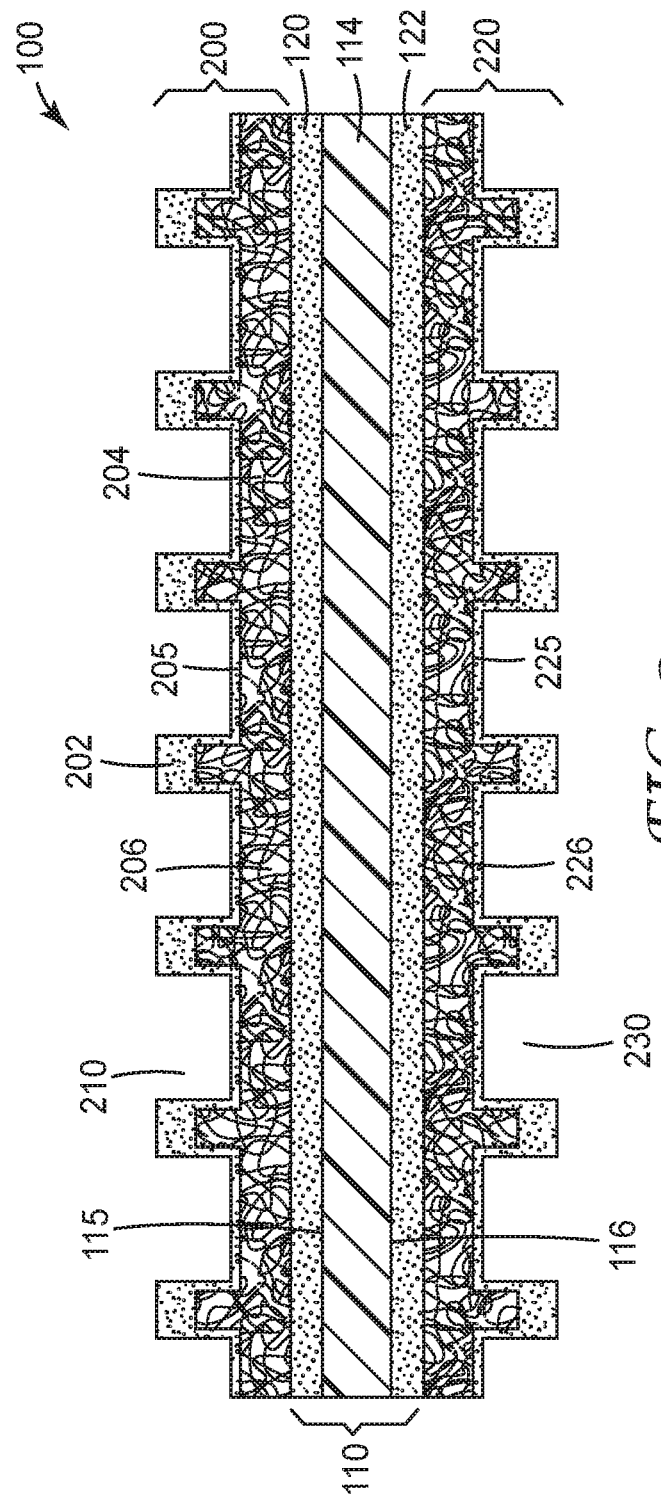
FIG. 3 is a cross-sectional view of the adhesive assembly of FIGS. 1 and 2.

FIGS. 1-3 depict an exemplary embodiment of an adhesive assembly 100 as generally described herein. The adhesive assembly 100 includes a stiffening carrier 110 including a backing 114 and carrier adhesives 120, 122 on opposing surfaces 115, 116 of the backing 114. A first exterior adhesive construction 200 comprising a consolidated nonwoven is coupled to the first major surface 115 of the carrier 110 via first carrier adhesive layer 120, while a second exterior adhesive construction 220 also comprising a consolidated nonwoven is coupled to the second major surface 116 via carrier adhesive layer 122. Each consolidated nonwoven includes an adhesive layer 202, 222 affixed to a core 204, 224. Each adhesive layer may be single layer or multilayer. The carrier backing 114 and cores 204, 224 may likewise be single layer or multilayer. The shape of the assembly 100 is not particularly limited and can include any suitable shape or combination of shapes.

Materials forming the stiffening carrier backing 114 can include paper, natural or synthetic polymer films, nonwovens made from natural and/or synthetic fibers and combinations thereof, fabric reinforced polymer films, fiber or yarn reinforced polymer films or nonwovens, fabrics such as woven fabric formed of threads of synthetic or natural materials such as cotton, nylon, rayon, glass, ceramic materials, and the like, or combinations of any of these materials. The carrier 114 may also be formed of metal, metallized polymer films, or ceramic sheet materials in combination with at least one of the above. In some embodiments, the carrier 114 is a multilayered film having two or more layers; in some such embodiments the layers are laminated For example, the carrier 114 can be formed of a foam, a film, or a combination thereof with any suitable thickness, composition, and opaqueness or clarity. In other embodiments, the carrier may include an arrangement of discrete particles or an adhesive or other composition having relatively high gel content. Exemplary materials and constructions for the carrier 114 are explored in further detail below. Combinations of two or more such compositions and constructions are also useful in various embodiments of the present disclosure.

In the specific embodiment of FIGS. 1 & 2, the carrier 110 includes a single layer backing and two adhesive layers having a collective thickness "T", though multilayer or multi-material constructions are also contemplated and described herein. In some embodiments, the carrier has a thickness "T" of between about 1 mils and about 125 mils. In some embodiments, the core has a thickness of greater than 1 mils, greater than 5 mils, greater than 8 mils, greater than 10 mils, greater than 12 mils, greater than 15 mils, or greater than 20 mils. In some embodiments, the carrier has a thickness of less than 125 mils, less than 100 mils, less than 90 mils, less than 80 mils, less than 75 mils, less than 70 mils, less than 60 mils, less than 55 mils, less than 50 mils, less than 45 mils, less than 40 mils, less than 36 mils, less than 35 mils, less than 30 mils, less than 32 mils, less than 28 mils, or less than 25 mils. In embodiments featuring a likely tip load bearing on the construction, the carrier backing is commonly less than about 35 mils. The ranges include all integers residing between any two given endpoints, even if not specifically recite.

As depicted in FIG. 3, the carrier 110 is generally rectangular in cross-section, however the carrier may have a variety of cross-sectional shapes. For example, the cross-sectional shape of the carrier 110 may be a polygon (e.g., square, tetrahedron, rhombus, trapezoid), which may be a regular polygon or not, or the cross-sectional shape of the core 110 can be curved (e.g., round or elliptical).

Each of the major surfaces 115, 116 of the carrier backing 114 are adjacent to carrier adhesive layers 120 and 122. Carrier adhesive layers 120 and 122 can be the same as one another or disparate from one another. Disparate, in this context, is used to describe substantial differences in composition or adhesive performance. Carrier adhesive layers 120 and 122 can each be a single layer or can be multilayer. Adhesive layers 120 and 122 can each be continuous or discontinuous (e.g., patterned) across the major surfaces of the carrier backing 114. In other exemplary embodiments described in further detail below, a carrier 110 may lack an adhesive layer on either or both the first and second major surfaces 115, 116.

The carrier adhesive layers 120, 122, as depicted, are no more than coextensive with the major surfaces 115, 116 of the carrier backing 114 and are separated by the thickness "T". The thickness of the adhesive layer(s) is not particularly limited but is typically substantially continuous across at least the major surfaces of the core. In presently preferred implementations, the thickness of the adhesive layer is no greater than 95% of the core thickness "T", no greater than 90%, no greater than 80%, no greater than 75%, no greater than 60%, no greater than 50%, no greater than 40%, no greater than 30%, no greater than 20%, and in some embodiments no greater than 10% of the carrier backing thickness "T". In typical embodiments, one or both adhesive layers 120, 122 have a thickness of between about 1 mil and about 3 mils. The thickness of a given adhesive layer 120, 122 may be different from the other or the same.

The carrier 110 typically possess as higher stiffness as compared to the either or both of the exterior adhesive constructions. The higher stiffness can result from the construction of the carrier backing, one or both carrier adhesive layers, or any combination thereof. The stiffness of carrier 110 (or any other component of the assembly 100) can be defined by the combination of thickness and Young's modulus. Exemplary Young's Modulus's of mounting assemblies described herein are between about 100 PSI and about 15,000 PSI. As used herein, the term "high stiffness component(s)" refers to a component of an adhesive assembly described herein that has a stiffness at least about 5% greater than an exterior adhesive construction. In some embodiments, the high stiffness component has a stiffness that is between about 5% and about 10,000% greater than the stiffness of the exterior adhesive construction. In some embodiments the high stiffness component has a stiffness that is at least 50% greater than the stiffness in the exterior adhesive construction. In some embodiments the high stiffness component has a stiffness that is at least 100% greater than the stiffness in the exterior adhesive construction. In some embodiments the high stiffness component has a stiffness that is at least 1000% greater than the stiffness in the exterior adhesive construction. In some embodiments the high stiffness component has a stiffness that is at least 5000% greater than the stiffness in the exterior adhesive construction. In some embodiments, the lower stiffness component(s) has a Young's modulus of between about 600 PSI to about 1500 PSI. In some embodiments, the higher stiffness component has a Young's modulus of between about 660 PSI and about 2000 PSI.

Without wishing to be bound by theory, providing a higher stiffness carrier can improve the shear strength and attendant holding capacity of the adhesive assembly by preventing or delaying adhesive failure that would otherwise result from the direct application of the exterior adhesive construction to an adherend.

As best demonstrated by reference to FIGS. 1 and 3, each exterior adhesive construction 200, 220 includes an array of recesses 210, 230 formed in a nonwoven core 204, 224. Recesses, for example, can include wells, cavities, concavities, pockets, channels, and the like. Recesses 210, 230 can have a volume with dimensions such as diameter, radius, depth, length, and width. A base of the recess can generally refer to a location within the recessed feature having points lying closest to an average elevation of a major surface, while the surface or region of the recess farthest from the average elevation is considered an apex or bottom surface. In presently preferred implementations (and as depicted), the recesses take the form of channels defining an arranged (e.g., repeating) pattern in the nonwoven core.

In several embodiments (including those depicted in FIGS. 1-8), the nonwoven core 204, 224 of any consolidated adhesive construction present includes an arranged pattern of recesses 210, 230 An "arranged pattern" is a plurality of features (e.g., recesses, channels, etc.) arranged at predetermined positions, arranged with some degree of regularity, or deliberately arranged in any desired manner. The recesses 210, 230 in cores 204, 220 are each arranged as a series of hexagon-shaped indentations, but other patterns, recess shapes, and arrangements are possible. In some embodiments, one or both recesses 210, 230 are distributed as a periodic array across a core surface (e.g., a one-dimensional array or a two-dimensional array, for example a square array, hexagonal, or other regular array). For example, the arranged pattern of recesses can include an arranged row pattern, an arranged lattice pattern such as an arranged square lattice pattern, an arranged zigzag pattern, or an arranged radial pattern. The arranged pattern need not be formed evenly on the entire surface but may be formed in only a portion of a given major surface. The pattern of recesses may vary or remain the same over any portion of the article. For example, similar or different patterns can be used within the same plane. The recesses within the pattern can be of similar geometry or can have different geometries. Similarly, the pattern of recesses 210 on the first exterior core 204 may be the same or different than the corresponding pattern of recesses 230 on the second exterior core 224. In certain implementations, the patterns 210, 230 on the first and second exterior constructions 200, 220 may have substantially the same pitch and recess geometry.

In one exemplary construction, the arranged pattern of features can include both an array of discrete recesses (e.g., wells) and a series of channels extending between and/or through individual wells. In other exemplary constructions, the arranged pattern features only an array of discrete wells.

Each array of recesses 210, 230 includes a transverse direction, generally along the x-axis and a longitudinal direction, generally along the y-axis. The arranged patterns can include a defined pitch between nearest-neighboring, adjacent recesses 210, 230. The pitch between nearest-neighboring, adjacent recesses 210, 230 in an array or pattern may be the same in both the transverse direction and longitudinal direction. In other embodiments, the pitch along the transverse direction is less than the pitch along the longitudinal direction, and vice versa.

The arranged pattern of recesses may result in a particular density of recesses 210, 230 per square centimeter. For example, the recesses can appear as discrete features in a sea of core material, or may encompass the majority of the core surface such that the core appears as a mesh or scrim. In some implementations, a major surface comprises at least 50 recesses per square centimeter, in some embodiments at least 100 recesses per square centimeter, in some embodiments, at least 200, and in yet other embodiments at least 300 microstructures per square centimeter. The core may comprise no greater than 2000 recesses per square centimeter, in some embodiments no greater than 1500, in some embodiments no greater than 1000, in some embodiments no greater than 750, and in other embodiments no greater than 500 recesses/cm$^2$. Without wishing to be bound by theory, greater density of the recesses has been shown to be correlated with higher shear performance of the adhesive article. Under certain circumstances, a greater density of recesses requires a higher peel force to initiate internal delamination where desired.

The recesses 210, 230 can take the form of any shape. Similarly, the three-dimensional geometry of the recesses 210, 230 is not particularly limited so long as the recess does not fully extend through the thickness of the core to the opposing major surface. The illustrated embodiment of the core 200 comprises a plurality of channels having a generally rectangular cross-section. The shape of the channels can vary according to the processing methods, but each typically has a V-shaped, U-shaped, rectangular or trapezoidal cross section on observation in a transverse direction. Additional non-limiting examples of shapes that are suitable for recesses include circles, triangles, squares, rectangles, and other polygons. The three-dimensional geometry of the recesses 210, 230 can include circular cylindrical; elliptical cylindrical; cuboidal (e.g., square cube or rectangular cuboid); conical; truncated conical and the like.

Regardless of cross-sectional shape, each recess 210, 230 comprises a largest cross-sectional dimension. The size of the largest cross-sectional dimension is not particularly limited but is typically at least 0.5 millimeters. A recess 210, 230 typically includes a depth "D" inversely related to the thickness "M" of a membrane 206, 226 created in the core (as further described below). A relatively thicker membrane will result in shallower recess depth. It may be noted, however, that not all recesses of the plurality of recesses need fall within the depth range listed above.

As depicted, one or both recesses 210, 230 are discrete along one direction, such that the recesses resemble channels in the core, or may extend diagonally across one or both the major surfaces of the core. Such channels can follow any desired path and can be continuous or discontinuous across a surface of the core in any given direction. The channels typically either terminate at the peripheral portion of the adhesive construction or communicate with other channels that terminate at a peripheral portion of the construction. In other embodiments, the recesses can be discrete along both the transverse and longitudinal directions.

The recesses 210, 230 on each of the first and second adhesive constructions can each have substantially the same geometry. In other embodiments, the size or shape of the recesses 210, 230 may change across the transverse direction, longitudinal direction, or combinations thereof. In yet other embodiments, a major surface can include two or more recesses of different geometries arranged in repeating unit cell. The unit cell can be repeated in an arranged pattern of unit cells. A variety of shapes may be used to define the unit cell, including rectangles, circles, half-circles, ellipses, half-ellipses, triangles, trapezoids, and other polygons (e.g., pentagons, hexagons, octagons), etc., and combinations thereof. In such embodiments, each unit cell boundary is directly adjacent the boundary of a neighboring unit cell, so that the plurality of unit cells resembles, e.g., a grid or tessellation. The sizes and shapes of the recesses can vary widely, and the recesses need not be the same size or shape in a particular area of the core 202, 222. For example, in some embodiments, the recesses 210, 230 can form an aesthetic pattern, an image, a logo, a bar code or a QR code, and the like.

The core adjacent the bottom surface 205, 225 can define a relatively thin membrane 206, 226 of core material. Any given collection of membranes can extend along the same plane within the core 204, 224, such that the depth D is substantially the same for all recesses within the arrangement. In alternative implementations, the location of the membrane 206, 226 in the z-direction within the core 204, 224 varies along the transverse direction, the longitudinal direction, or both.

The membrane 206, 226 separates the bulk of the exterior adhesive layers 202, 222 from the opposing carrier adhesive layer 120, 122, respectively. The membrane 206, 226 typically has a thickness of at least about 5% of the thickness of the core, and in other embodiments at least about 10% of the thickness of the core. In the same or other embodiments, the thickness "M" is no greater than 95% of the thickness of the core 204, 224. In embodiments featuring a nonwoven core, the thickness of the membrane is typically correlated with the porosity of the given nonwoven material(s). Under certain circumstances and constructions described herein and without wishing to be bound by theory, the structural integrity of the core can be more easily compromised upon peel removal with relatively thinner membranes 206, 226 throughout the body of core 204, 224. Comingling of the carrier adhesive with the exterior adhesive, however, may reduce or prevent the desired delamination of the exterior adhesive construction; the carrier adhesives are accordingly kept relatively thin to avoid such contact.

The membrane 206, 226 typically possesses a lower porosity than the core 204, 224 in the non-recessed/unpatterned areas. In some embodiments, the void volume (or porosity) of the membrane is no greater than 50 percent, no greater than 40 percent, no greater than 30 percent, no greater than 20 percent, and in some other embodiments no greater than 10 percent the porosity of the non-recessed area.

The recesses 204, 224 can be created in a core material before, during, or after an adhesive layer 210, 230 is applied to a major surface. The recesses 204, 224 can be created by a combination of force and thermal/fusion energy, such as ultrasonic welding (or bonding), thermal contact welding, and/or point welding to reduce the thickness (i.e., consolidate) of core material. Though not depicted in the current set of Figures, the creation of recesses 204, 224 on one major surface of the core 202, 222 can result in the creation of corresponding recesses on the opposing major surface of the core. In implementations featuring a nonwoven or other porous core material, the creation of recesses 204, 224 can condense the core material by reducing porosity and/or causing core material to flow into regions of the core adjacent the bonding site. In certain implementations the recesses are created by ultrasonic point bonding of the adhesive layer and the core according to an arranged pattern. Point bonding may also occur by, for example, by passing the core and the adhesive layer(s) through a heated patterned embossing roll nip. The point bonding creates an intermittent bond between the adhesive and core, condensing a portion of both the peelable adhesive and core material into the depths of individual recesses. In other embodiments, the desired pattern (including one or multiple patterns) may be created in the core prior to application of the adhesive layer. In yet other embodiments, multiple patterns may be created in the core, one or more prior to application of the adhesive layer and one or more after application of the adhesive layer.

Ultrasonic welding (or bonding) generally refers to a process performed, for example, by passing the requisite layers of material between a sonic horn and a patterned roll (e.g., anvil roll). Such bonding methods are well-known in the art. For instance, ultrasonic welding through the use of a stationary horn and a rotating patterned anvil roll is described in U.S. Pat. No. 3,844,869 (Rust Jr.); and U.S. Pat. No. 4,259,399, "Ultrasonic Nonwoven Bonding," (Hill). Moreover, ultrasonic welding through the use of a rotary horn with a rotating patterned anvil roll is described in U.S. Pat. No. 5,096,532 (Neuwirth, et al.); U.S. Pat. No. 5,110,403 (Ehlert); and U.S. Pat. No. 5,817,199, (Brennecke, et al.). Of course, any other ultrasonic welding technique may also be used in the present invention.

In presently preferred implementations, the core 202, 224 of the exterior adhesive constructions is pattern embossed, according to procedures well known in the art, such as those described in U.S. Pat. No. 2,464,301 (Francis Jr.), U.S. Pat. No. 3,507,943 (Such et al.), U.S. Pat. No. 3,737,368 (Such et al.), and U.S. Pat. No. 6,383,958 (Swanson et al) and set forth in more detail below. In general, the core and adhesive layer(s) are passed through a metal roll that is patterned (e.g., engraved) with raised and depressed areas, and a solid back-up roll, generally formed of metal or rubber. However, the core can also be fed between two patterned rolls displaying corresponding or alternating engraved areas. In either case, it is typical to supply heat to one or more of the rolls so that the core is thermally bonded along the points of pattern contact. An embossed pattern is distinguishable from a "perforated" pattern, which refers to a predetermined configuration of punctures that pass through the entire thickness of the core.

While not wishing to be bound by any particular theory, it is believed that the recesses in the embossed pattern are formed by localized melting of the core in the pattern of the raised areas on the patterned embossing roll. The core is not destroyed by the process but, instead, maintains its integrity.

Moreover, the heat from the one or more rolls causes the adhesive to flow into at least some of the voids in the core prior to and/or contemporaneous with the creation of the recesses through contact pressure. Typically, the majority of the adhesive will remain within membrane voids, though some volume may flow into the surrounding core as well. For instance, an array of recesses created through heated pattern embossing an adhesive laminated nonwoven will typically include a greater amount of adhesive within the voids in comparison to the same pattern created through ultrasonic welding.

When an array of recesses is created by pattern embossing, the degree of reduction in void volume due to consolidation or densification in a given membrane may be reduced relative to the consolidation resulting from ultrasonic welding. In some embodiments featuring an embossed pattern(s), the void volume (or porosity) of the membrane is no greater than 90 percent, no greater than 70 percent, no greater than 60 percent, no greater than 50 percent, and in some other embodiments no greater than 40 percent the porosity of the non-recessed area of the core.

The membrane 206, 226 may be at least partially infused with adhesive. In certain presently preferred embodiments, one or both of the exterior adhesive constructions 200, 220 include a peelable adhesive composition at least partially within the pores of a porous core. For such embodiments, at least 40 volume %, at least 50 volume %, at least 60 volume %, at least 70 volume %, at least 80 volume %, preferably at least 90 volume %, and more preferably 100 volume % of the void volume is filled with the peelable adhesive composition. The amount of adhesive within the pores will depend on, among other things, the modulus of the adhesive, the method used to create the recesses, the thickness of the core, and the porosity of the core material.

The intermittent bonding of an adhesive to the nonwoven fabric or web (e.g., using at least one of heat, pressure, or ultrasonics as described above) to create recesses can collapse (i.e., condense or consolidate) porous structure at or in the bond sites, resulting in the creation of membranes 176. The bond sites may be see-through regions of lower porosity that contrast with the surrounding region. The term "see-through" refers to either transparent (that is, allowing passage of light and permitting a clear view of objects beyond) or translucent (that is, allowing passage of light and not permitting a clear view of objects beyond). The see-through region may be colored or colorless. It should be understood that a "see-through" region is large enough to be seen by the naked eye.

In certain embodiments, the nonwoven material for the cores 204, 224 is selected so that it forms a relative weak bond with either adhesive layer.

In other embodiments, the material or construction of the core is selected so that it delaminates, fails cohesively, or otherwise separates upon application of force generated on the adhesive article during removal.

While the above describes the exterior adhesive constructions solely as constituting consolidated nonwovens, other peelable adhesive constructions may be suitable for the exteriors of the composite assemblies of the present disclosure. Exemplary, though non-exclusive, constructions include: 1) those featuring different core materials (e.g., adhesives or particles) described in US Publication No. 2020/0190365 (Krull et al.); 2) those constructions including the adhesive layers sealed in areas surrounding the perimeter of a distinct core as described in US Publication 2020/0224060 (Krull et al.); 3) those constructions including a conformable backing as described in US Publication No. 2019/0048233 (Cowman-Eggert); 4) those constructions built on a polymeric backings described in US Publication No. 2019/0002737 (Runge et al.); and 5) those constructions featuring microtextured skin layer as described in U.S. Pat. No. 5,354,597 (Capik et al.)

Figure 4:
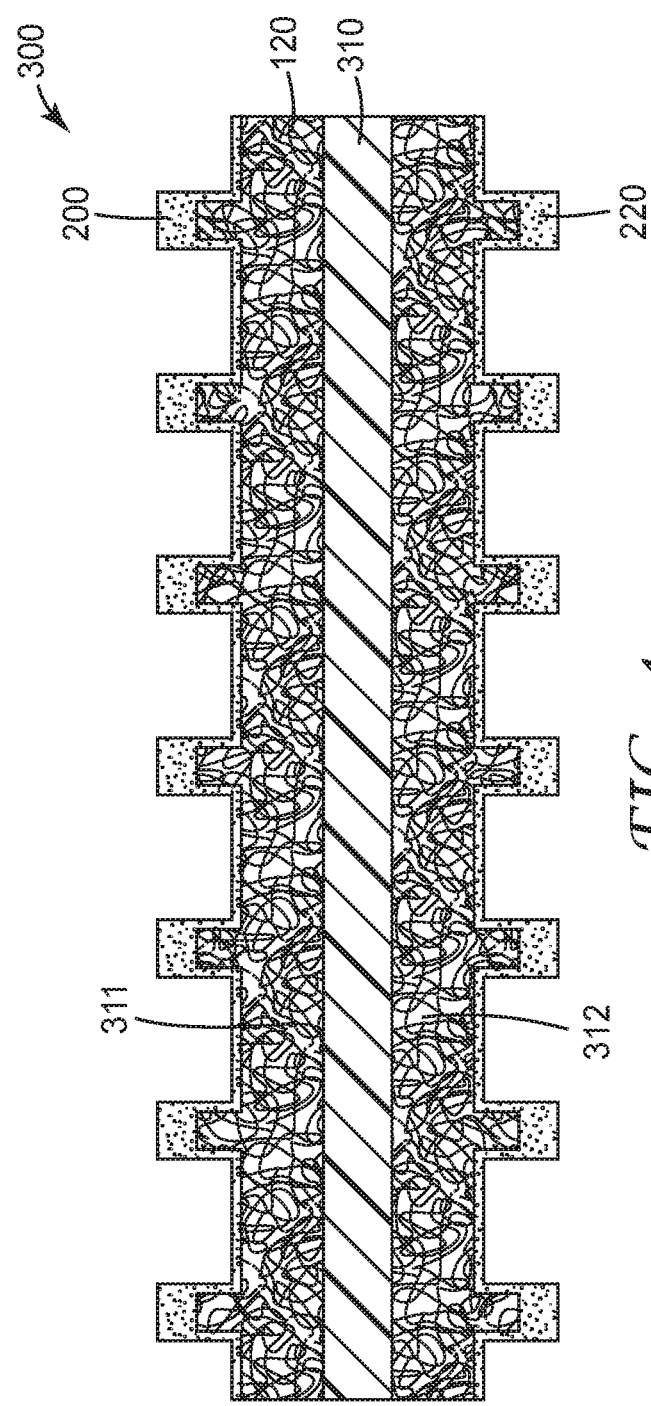
FIG. 4 is a cross-sectional view of another embodiment of an exemplary adhesive assembly of the type generally described herein.

Another exemplary embodiment of an adhesive assembly 300 is depicted in FIG. 4. Except as otherwise noted, all other considerations regarding the adhesive assembly 100 apply equally to adhesive assembly 300 and like elements are indicated with like reference characters. The adhesive assembly 300 includes a carrier 310, a first exterior adhesive construction 200 on a first major surface 311 of the carrier 310, and a second exterior adhesive construction 220 including a consolidated nonwoven on a second major surface 312 of the carrier 310. The carrier 310 includes a single carrier component: either a carrier backing or a carrier adhesive layer. Instead of the multi-component carrier of FIGS. 1-3, the first and second exterior adhesive constructions 200, 220 can be directly laminated or otherwise fixed to carrier backing 310 using the methods described herein. The lamination or other affixation of an exterior adhesive construction to the carrier can occur before, during, or after the requisite nonwoven consolidation step. Direct lamination may, in certain circumstances, reduce opportunities for unintentional adhesive failure between the carrier and exterior adhesive constructions 200, 220.

Figure 5:
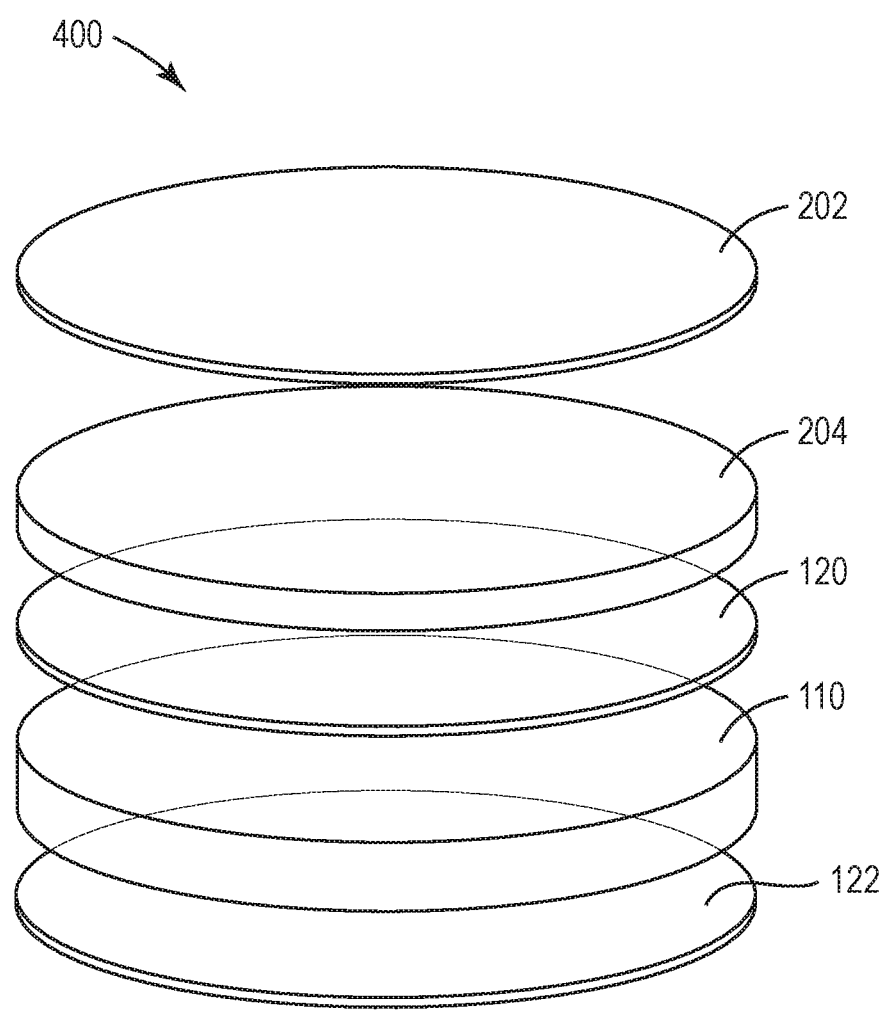
FIG. 5 is an exploded view of another embodiment of an exemplary adhesive assembly of the type generally described herein.
Figure 6:
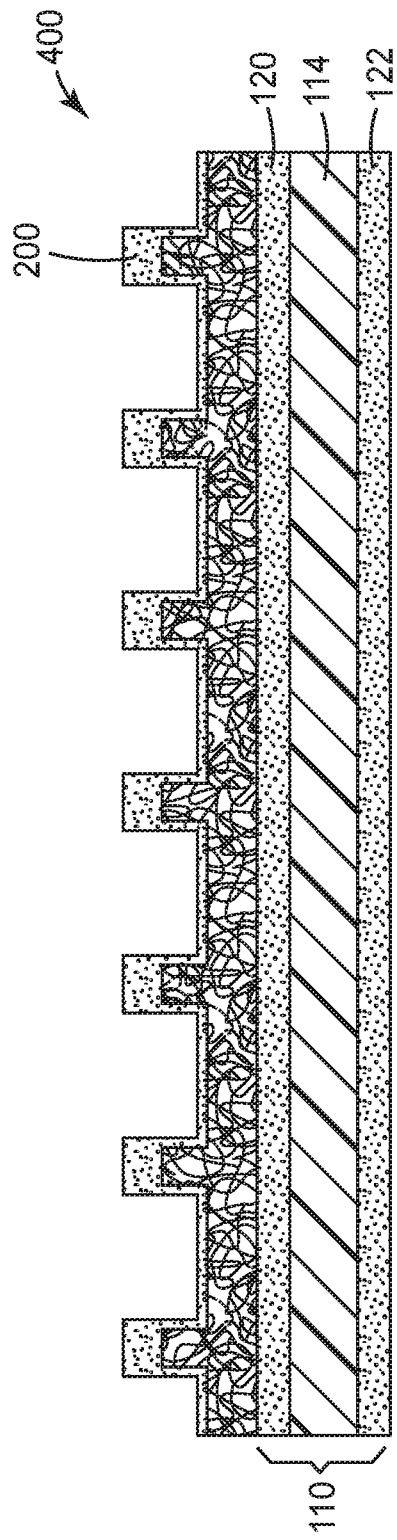
FIG. 6 is a cross-sectional view of the assembly of FIG. 5.

Another exemplary embodiment of an adhesive assembly 400 is depicted in FIGS. 5 and 6. Except as otherwise noted, all other considerations regarding the adhesive assemblies 100 and 300 apply equally to adhesive assembly 400, and like elements are indicated with like reference characters. The adhesive assembly 400 includes a carrier 110 and a first exterior adhesive construction comprising a consolidated nonwoven 200 on a first major surface 111 of the carrier 110. Unlike assemblies 100 and 300, the assembly lacks a second exterior adhesive construction on the second major surface of the carrier backing, aside from the carrier adhesive layer 122. In use, the exterior adhesive construction 200 is generally affixed to a rough or delicate surface (e.g., a vertical wall) and the carrier adhesive layer attached to a hardgood or another item to be mounted. The assembly 400 may be well suited for mounting applications in which damage to the item affixed to the carrier adhesive layer 122 is of limited concern.

Figure 7:
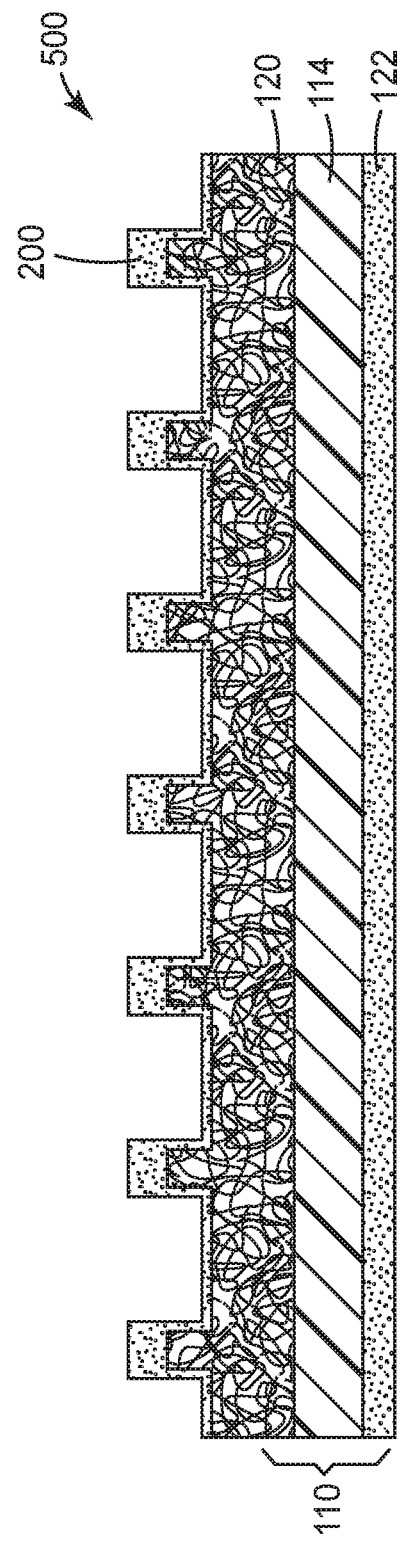
FIG. 7 is a cross-sectional view of another embodiment of another exemplary adhesive assembly of the type generally described herein.

Another exemplary embodiment of an adhesive assembly 500 is depicted in FIG. 7. Except as otherwise noted, all other considerations regarding the adhesive assemblies 100 and 300 apply equally to adhesive assembly 500, and like elements are indicated with like reference characters. The adhesive assembly 500 includes a carrier 110 and a first exterior adhesive construction comprising a consolidated nonwoven 200 secured directly to a first major surface 111 of the carrier backing 114. Unlike assemblies 100 and 400, the assembly lacks a carrier adhesive layer 120 on the first major surface of the carrier backing, with the consolidated nonwoven affixed directly to the carrier backing.

Figure 8:
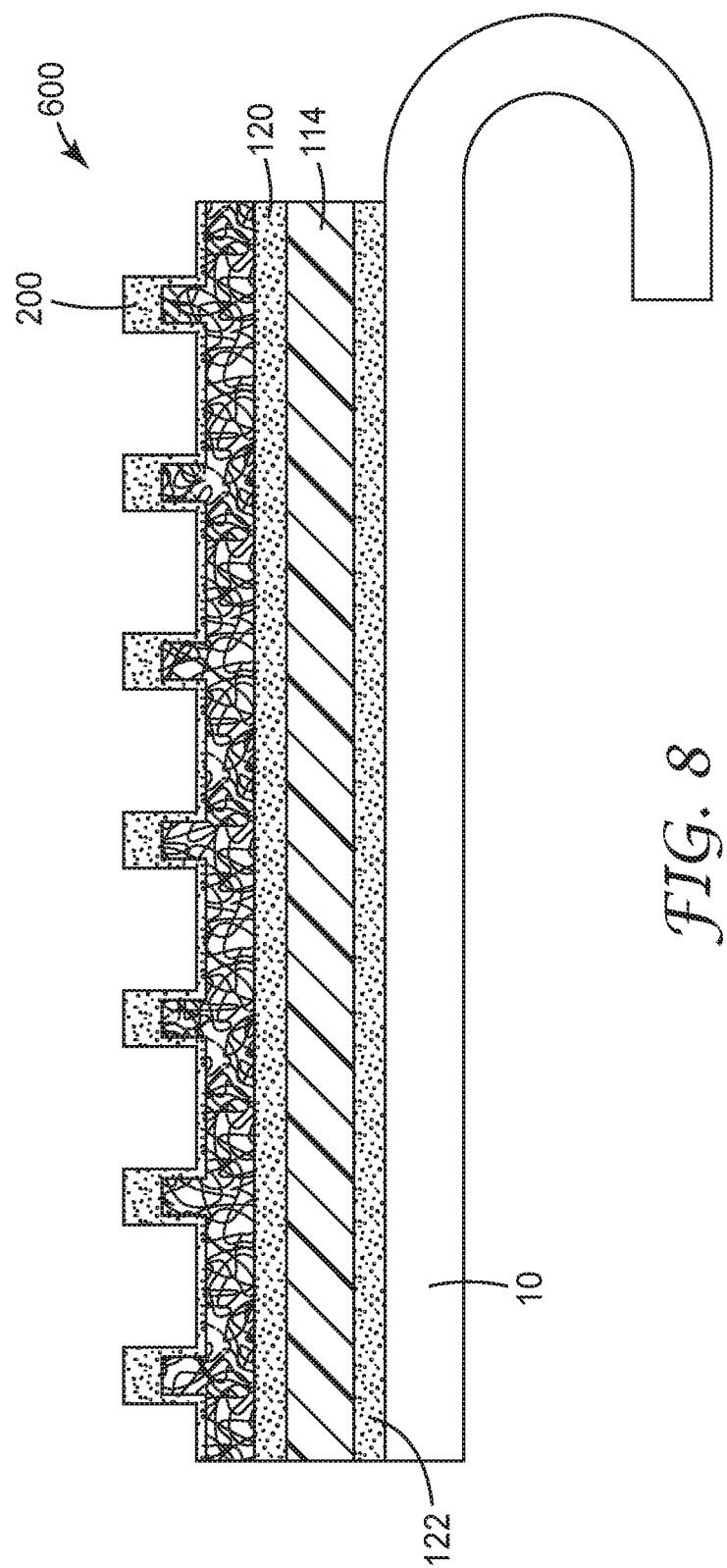
FIG. 8 is a cross-sectional view of another embodiment of another exemplary adhesive assembly of the type generally described herein.

FIG. 8 depicts another exemplary embodiment of an adhesive mounting assembly 600 of the type generally described herein including a carrier backing 414 and first and second carrier adhesive layers 120, 122. A single exterior construction 200 featuring a consolidated nonwoven is affixed to the carrier backing 114 via the carrier adhesive layer 120. A hardgood 10 (here a mounting hook) is affixed to the second adhesive layer 122, creating a hardgood adhesive interface. The first major surface 201 of the exterior adhesive construction 200 can be used to fix the assembly 600 to the desired adherend (e.g., wall surface, cabinet surface, etc.). The carrier can provide improved control over unintentional removal or damage to the exterior adhesive construction when an object is hung from the hardgood. Any of the assemblies 100, 300, 400 and 500 may also be attached directly to the surface of a hardgood.

In other embodiments (not depicted) the carrier may be fixed to the hardgood while the exterior adhesive construction(s) is laminated to the carrier. Such embodiments may lack a second carrier adhesive layer between the carrier and the hardgood.

In certain embodiments, the second adhesive layer 122 may be applied at a greater coating weight than the first adhesive layer 120. The disparity in coating weight and/or layer thickness can ensure the core stays with the hardgood when the adhesive article 600 is removed from an adherend.

The adhesive assemblies of the present disclosure include available bond areas defined by the total area of the unpatterned region of the exterior adhesive construction (i.e., the area within each channel or other recess) is excluded from the bond area calculation, since the adhesive within the depths of the recesses will not typically contribute as much to the bond of the exterior construction to the desired adherend). In some embodiments, the available bond area of the article is at least about 5%; at least about 10%, at least about 25%; at least about 30%; at least about 35%; at least about 40%; at least about 45%; at least about 50%; at least about 55%; at least about 60%; at least about 65%; at least about 70%; at least about 75%; or at least about 80% of an expected surface area of a core material including like dimensions and lacking recesses. In some embodiments, the articles include an available bond area of between about 10% and about 90%. In yet other embodiments, the articles include an available bond area of between about 15% and about 70% of an expected surface area of a core material including like dimensions and lacking recesses.

Constituent elements of the adhesive assemblies described herein are explored in more detail below.

Carrier

The carrier is part of the adhesive assembly and interferes with the interfacial bonding of portions of otherwise adjacent exterior adhesive constructions. The carrier can be a single layer or a multilayer construction. More than one layer of material can be present in the carrier. Multiple carrier layers can be separated by layers of film, which may further contain one or more layers. In some embodiments, the carrier includes at least one of plastic, metal, paper, including both flat or smooth paper as well as textured paper such as crepe paper, nonwoven material, textile, woven material, foam, adhesive, gel, and/or a filament reinforced material.

In some embodiments, two or more sub-layers can be co-extruded or laminated so as to form the carrier backing. In some embodiments, the carrier is flexible. Some embodiments include dyes or pigments in the carrier layer(s). Some embodiments include at least one tackifier in at least one layer of the core. Some embodiments include a plasticizing oil in one or more layers of the core.

Carrier Backing

The carrier backing can be made of any desired material or materials. Representative examples of materials suitable for the carrier backing can include, for example, polyolefins, such as polyethylene, including high density polyethylene, low density polyethylene, linear low density polyethylene, and linear ultralow density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadienestyrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used.

In some embodiments, the carrier is or includes a composite foam that includes a flexible polymeric foam layer, a first film laminated to a first major surface of the foam layer, and a second film laminated to a second, opposite major surface of the foam layer. Carrier adhesive(s) can be attached to the films to form a structure of adhesive-film-foam-film-adhesive. The flexible polymeric foam layer can be chosen to optimize conformability and resiliency properties which are helpful when an adhesive assembly is to be adhered to surfaces having surface irregularities, such as a typical wall surface. An exemplary flexible polymeric foam layer is commercially available under the trade designation "Command" from 3M Company of St. Paul, Minn. In some embodiments, the flexible polymeric foam layer of the core can include polyolefin foams which are available under the trade designations "Volextra" and "Volara" from Voltek, Division of Sekisui America Corporation, Lawrence, Mass. In some embodiments, the core is or includes a metal or is metal-like. In some embodiments, the core is or includes wood or is wood-like.

Polymeric foams can include open-celled foams, closed-celled foams or combinations thereof. In some embodiments, the foam can be surface modified by thermal, chemical (e.g., acid-etching, corona treatment, plasma etching, glow discharge, or flame treatment), and/or photochemical (e.g., ultraviolet irradiation) processes. In certain embodiments, the polymeric foam has a void volume of at least 20 volume %, at least 30 volume %, at least 40 volume %, at least 50 volume %, and at least 55 volume %.

In certain embodiments, the polymeric foam has a void volume of at most 70 volume %, preferably at most 65 volume %, more preferably at most 60 volume %. For polymeric foams in which the bulk density of the polymer is typically near 1, foam densities can be closely correlated with void volumes. Thus, denser foams are preferred, as they typically provided the desired increase in relative stiffness as compared to the exterior adhesive construction.

In many embodiments of the present disclosure, the carrier backing may include or consist of a polymeric film. Polymeric film carrier backing layers can be in a variety of forms including, for example, a single-layer or multi-layer film, a porous film, and combinations thereof. The polymeric film may contain one or more fillers (e.g., calcium carbonate). The polymer film can be a continuous layer or a discontinuous layer. Multi-layer polymer films are preferably integrally bonded to one another in the form of a composite film, a laminate film, and combinations thereof. Multilayer polymeric films can be prepared using any suitable method including, for example, co-molding, coextruding, extrusion coating, joining through an adhesive, joining under pressure, joining under heat, and combinations thereof.

The film may comprise a single polymeric material or may be prepared from a mixture of polymeric materials. Examples of suitable materials include polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(meth) acrylates such as polymethylmethacrylate; polyurethanes; polyvinyl chloride; polycyclo-olefins; polyimides; or combinations or blends thereof.

Examples of materials that can be included in the carrier backing include polyolefins such as polyethylene, polypropylene (including isotactic polypropylene), polystyrene, polyester, polyvinyl alcohol, poly(ethylene terephthalate), polybutylene terephthalate), polyimide, poly(caprolactam), poly(vinylidene fluoride), polylactides, cellulose acetate, and ethyl cellulose and the like. The polymeric film layer can be a single layer or a multilayer construction. More than one polymeric film layer can be present. The polymeric film layers can be comprised of any film-forming polymers.

In some embodiments, the polymeric film layer(s) includes at least one of a vinylaromatic copolymer, a linear low density polyethylene, a low density polyethylene, a high density polyethylene, a copolymer of ethylene and (meth) acrylate monomers, a copolymer of ethylene and (meth) acrylate monomers containing acid modifications, a copolymer of ethylene and vinyl acetate, a copolymer of ethylene and vinyl acetate containing acrylate, and/or acid modifications. In some embodiments, the film contains polymers from olefin monomers with between 2 and 16 carbons. In some embodiments, the film is a copolymer of two or more olefin monomers. In some embodiments, the film contains polymers from olefin monomers with atactic, syndiotactic, or isotactic stereochemistry. In some embodiments, the film is a copolymer of one or more olefin monomers polymerized using a metallocene catalyst. In some embodiments, the film is comprised of vinyl copolymers such as poly(vinyl chloride), poly(vinyl acetate), and the like. In some embodiments, the film is a blend comprised of any of the polymers listed above.

Exemplary suitable film materials can include SEBS, SEPS, SIS, SBS, polyurethane, ethyl vinylacetate (EVA), ultra low linear density polyethylene (ULLDPE), hydrogenated polypropylene, ethyl methyl acrylate (EMA), ultra low linear density polyethylene (ULLDPE), hydrogenated polypropylene, high density polyethylene (HDPE), low density polyethylene (LDPE), linear low density polyethylene (LLDPE, polyesters including polyethylene terephthalate (PET), and combinations or blends thereof. In some embodiments, the polymeric film consists of multiple layers of any of the polymers listed above. In particular embodiments, the multiple layers include a carrier backing layer and one or more skin layers, as US Publication No. 2019/0002737 (Runge et al.); incorporated herein by reference in its entirety.

For some implementations, particularly those including paper, the carrier backing materials has a relatively increased amount of surface roughness. As should be self-evident, surface roughness is a measure of the roughness of a surface. Surface roughness can be measured using a technique such as confocal microscopy that can resolve features in the micrometer range. When describing surface roughness, either average roughness (Ra) or root-mean-square roughness (Rq) can be used, though Rq is presently preferred. Rq is the root mean square average of height deviations taken from the mean image data plane, expressed as:

$$Rq = \sqrt{\frac{\sum H_i^2}{N}} \quad \text{Equation 1}$$

where N is the total number of points and H is the height at each point (relative to the mean height). The present inventors discovered that carrier backing surfaces present a relatively higher Rq can provide longer weight holding periods, particularly where the carrier lacks a carrier adhesive layer (see e.g., FIGS. 4 & 5). Roughness tends to effect the adhesion on the exterior adhesive construction to the carrier backing but a rougher surface may not alone be sufficient to for a materials use as a carrier.

The carrier backing can be or include any of the materials or backings described in any of the following patent applications, all of which are incorporated in their entirety herein, International Publication Nos. WO2015/195344 (Runge et al.), 2018/144331 (Runge et al.), WO2018/183195 (Lehmann et al.), WO2019/005831 (Hoffman et al.) and WO2019/040820 (Krull et al.), all assigned to the present assignee. The carrier backing may also include the nonwoven substrates discussed below in relation to the core of exemplary exterior adhesive constructions.

In various embodiments, the carrier backing can be fabricated or produced from microstructured tape materials described in, e.g., U.S. Pat. No. 8,530,021 to Bartusiak et al.

The carrier backing can be substantially non-stretchable or can be elastic. In some embodiments, the carrier backing material has a storage modulus of between about $15 \times 10^3$ Pa and about $2.5 \times 10^6$ Pa at 25 degrees Celsius. In some embodiments, the carrier backing material has a tan δ (where tan δ is the loss modulus divided by the storage modulus) of between about 0.4 and about 1.2 at 25 degrees Celsius. In some embodiments, the core has a glass transition temperature of between about −125 and about 40 degrees Celsius. In other embodiments, the core material has a stress relaxation between 10% and 100% after 10 seconds.

In some embodiments, the carrier exhibits an elastic recovery of 1-99% at 10% strain. In some embodiments, the core exhibits an elastic recovery of 1-99% at 20% strain. In some embodiment of the disclosure, the core material has an elongation at break of greater than 50% in at least one direction. In some embodiment of the disclosure, the core material has an elongation at break of between about 50% and about 1200% in at least one direction.

In some embodiments, the core has a Young's modulus of between about 100 psi and about 100,000 psi. In other embodiments featuring glass materials or ceramics, the core may have a Young's modulus of up to 10,000,000 psi. In some embodiments, the core exhibits an elastic recovery of 1-100% at 10% strain as measured by ASTM D5459-95. In some embodiments, the core exhibits an elastic recovery of 1-100% at 20% strain.

In some embodiments, the carrier has a stiffness that is at least 1.01 times greater than the stiffness or modulus of one or both of the exterior adhesive constructions. In some embodiments, the higher stiffness carrier has a stiffness of section modulus that is about 1.5, about 1.75, about 2, about 3, about 4, about 5, about 6, about 7, about 8, about 9, about 10, about 20, about 30 about 40, about 50, about 60, about 70, about 80, about 90, about 100, about 500, about 1000, about 5,000, about 10,000, about 20,000, about 30,000, about 40,000, or about 50,000 times greater than the stiffness of the exterior adhesive construction.

In some embodiments, the carrier backing has a stiffness that is at least 1.01 times greater than the stiffness or modulus of one or both of the cores of exterior adhesive constructions. In some embodiments, the higher stiffness carrier backing has a stiffness of section modulus that is about 1.5, about 1.75, about 2, about 3, about 4, about 5, about 6, about 7, about 8, about 9, about 10, about 20, about 30 about 40, about 50, about 60, about 70, about 80, about 90, about 100, about 500, about 1000, about 5,000, about 10,000, about 20,000, about 30,000, about 40,000, or about 50,000 times greater than the stiffness of the core of the exterior adhesive construction. The stiffness comparison between the core and the carrier may be made using a Handle-O-Meter available from Thwing-Albert Instrument Company (West Berlin, NJ), using the test methods of ASTM D2923 and ASTM D6828-02.

In some embodiments, the carrier has a modulus of elasticity and/or a modulus of secant of between about 100 psi and about 15,000 psi as determined by at least one of ASTM D638-14 and ASTM D412-06a. In some embodiments, the core has a modulus ranging between 100 psi and 15000 psi. In some embodiments the modulus is greater than 100 psi, greater than 500 psi, greater than 1000 psi. In some embodiments the core modulus is less than 15000 psi, less than 10000 psi, less than 8,000 psi, less than 5,000 psi, less than 3,500 psi, less than 2000 psi, and less than 1500 psi.

Carrier Adhesive

In some embodiments, the carrier adhesive (or the carrier backing itself) is a pressure-sensitive adhesive. A general description of useful pressure sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Pressure sensitive adhesive compositions are well known to those of ordinary skill in the art to possess properties including the following: (1) tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Suitable PSAs may be based on crosslinked or non-crosslinked (meth)acrylics, rubbers, thermoplastic elastomers, silicones, polyurethanes, and the like, and may include tackifiers in order to provide the desired tac, as well as other additives. In some embodiments, the PSA is based on a (meth)acrylic PSA or at least one poly(meth)acrylate, where (meth)acrylate refers to both acrylate and methacrylate groups. In some embodiments, the PSA is an olefin block copolymer based adhesive. Acrylic based pressure sensitive adhesives are described in U.S. Pat. No. 4,726,982 (Traynor et al.) and in U.S. Pat. No. 5,965,256 (Barrera), for example. Silicone based pressure sensitive adhesives are described in U.S. Pat. No. 6,730,397 (Melancon et al.) and U.S. Pat. No. 5,082,706 (Tangney), for example. Polyurethane based pressure sensitive adhesives are described in U.S. Pat. Appl. Pub. No. 2005/0137375 (Hansen et al.), for example. Olefin block copolymer based pressure sensitive adhesives are described in U.S. Pat. Appl. Pub. No. 2014/0335299 (Wang et al.), for example.

In some embodiments, the carrier adhesive is peelable. In some embodiments, the adhesive releases cleanly from the surface of an adherend when the adhesive article is peeled at an angle of about 35° or less from a surface of the adherend. In some embodiments, the peelable adhesive releases from a surface of an adherend when an article is peeled at an angle of about 35° or greater from the adherend surface such that there are substantially no traces of the adhesive left behind on the surface of the adherend.

The carrier adhesive can include, for example, any of the adhesives described in any of the following patent applications, all of which are incorporated by reference herein: International Publication Nos. WO/2015/035556, WO/2015/035960, WO/2017/136219, WO/2017/136188 and U.S. Patent Publication No. 2015/034104, all of which are incorporated herein in their entirety.

In some embodiments, the peelable adhesive is a pressure sensitive adhesive. Any suitable composition, material or ingredient can be used in the pressure sensitive adhesive. Exemplary pressure sensitive adhesives utilize one or more thermoplastic elastomers, e.g., in combination with one or more tackifying resins. In some embodiments, the adhesive is not a pressure sensitive adhesive.

In some embodiments, the carrier adhesive layer can include at least one of rubber, silicone, or acrylic based adhesives. In some embodiments, the carrier adhesive layer can include a pressure-sensitive adhesive (PSA). In some embodiments, the carrier adhesive can include tackified rubber adhesives, such as natural rubber; olefins; silicones, such as silicone polyureas or silicone block copolymers; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques; polyurethanes; silicone block copolymers; and combinations of the above. In presently preferred embodiments, the carrier adhesive includes a tackified, synthetic rubber PSA.

Generally, any known additives useful in the formulation of adhesives may also be included. Additives include plasticizers, anti-aging agents, ultraviolet stabilizers, colorants, thermal stabilizers, anti-infective agents, fillers, crosslinkers, as well as mixtures and combinations thereof. In certain embodiments, the adhesive can be reinforced with fibers or a fiber scrim which may include inorganic and/or organic fibers. Suitable fiber scrims may include woven-, non-woven or knit webs or scrims. For example, the fibers in the scrim may include wire, ceramic fiber, glass fiber (for example, fiberglass), and organic fibers (for example, natural and/or synthetic organic fibers).

In some embodiments, the adhesive includes a tackifier. Some exemplary tackifiers include at least one of polyterpene, phenolic resins (e.g., terpene phenol and novolak resins), rosin esters, and/or rosin acids. Tackified adhesives used in the carrier layer (either as the carrier adhesive or the carrier backing) typically include higher tackifier loadings as compared to those used in the exterior adhesive constructions. The tackifier content of the carrier adhesive is typically between about 30 pph and 130 pph, based on 100 pph of the elastomer used in the adhesive.

In some embodiments, the carrier adhesive has a Tg of between about −125 degrees Celsius and about 20 degrees Celsius, as determined by dynamic mechanical analysis of the tan δ peak value. In some embodiments, the carrier adhesive has a Tg of between about −70 degrees Celsius and about 0 degrees Celsius. In some embodiments, the carrier adhesive has a Tg of between about −60 degrees Celsius and about −20 degrees Celsius. In some embodiments, the carrier adhesive has a Tg of greater than −80 degrees Celsius, greater than −70 degrees Celsius, greater than −60 degrees Celsius, greater than −50 degrees Celsius, greater than −40 degrees Celsius, or great than −30 degrees Celsius.

In some embodiments, the carrier adhesive has a Tg of less than 20 degrees Celsius, 10 degrees Celsius, 0 degrees Celsius, −10 degrees Celsius, −20 degrees Celsius, or −30 degrees Celsius.

Some carrier adhesives that can be used in the adhesive articles of the present disclosure have a storage modulus of about 300,000 Pa or greater, about 400,000 Pa or greater, about 500,000 Pa or greater, about 1,000,000 Pa or greater at 25° C., as determined by dynamic mechanical analysis. In other embodiments, the adhesive has a storage modulus of 750,000 Pa or less, 500,000 Pa or less, 400,000 Pa or less, 300,000 Pa or less, or 250,000 Pa or less at 25° C., as determined by dynamic mechanical analysis.

In some embodiments, the thickness of the carrier adhesive, if applied to one of the major surfaces of a distinct carrier backing, is about 0.5 to 3.5 mils. As referenced above, an excessive thick carrier adhesive may blend with an exterior adhesive in the exterior adhesive construction, eliminating the desirable, distinct properties of the consolidated nonwoven.

In some embodiments, adhesion properties of the carrier adhesive can range from 0.1 N/dm to 25 N/dm. In some embodiments, adhesion properties of the adhesive can range from 0.5 N/dm to 10 N/dm. In some embodiments, adhesion properties of the adhesive can range from 1 N/dm to 5 N/dm.

In some embodiments, the carrier adhesive can provide a shear strength of, for example, 1-20 pounds per square inch as measured by ASTM Test Method D3654M-06.

The carrier adhesive (or the carrier backing) may include a plurality of adhesive layers. For example, the carrier backing may include a relatively stiff rubber based adhesive as an inner layer, with a softer acrylic based PSA disposed between the inner layer and the exterior adhesive construction The characteristics of the adhesive in the carrier may be selected or modified to achieve the desired properties.

If used as the carrier backing, an adhesive can be of a different composition from either the carrier adhesive layer(s), if present, or the exterior adhesive construction to avoid an increase in cohesive strength at any core-adhesive interface. Alternatively, the surface of the adhesive can be modified by release materials or deadening layer(s).

Exterior Adhesive Construction

Nonwoven Core

In some presently preferred embodiments, the exterior adhesive constructions include a core featuring a nonwoven substrate. The nonwoven substrate can be a nonwoven fabric or web manufactured by any of the commonly known processes for producing nonwoven fabric or webs. As used herein, the term "nonwoven" refers to a fabric that has a structure of individual fibers or filaments which are randomly and/or unidirectionally interlaid in a mat-like fashion, but not in an identifiable manner as in a knitted fabric. Nonwoven fabrics or webs can be formed from various processes such as meltblowing processes, spunbonding processes, spunlacing processes, and bonded carded web processes, air laying processes, and wet laying processes. In some embodiments, the core comprises multiple layers of nonwoven materials with, for example, at least one layer of a meltblown nonwoven and at least one layer of a spunbonded nonwoven, or any other suitable combination of nonwoven materials. For example, the core may be a spunbond-meltbond-spunbond, spunbond-spunbond, or spunbond-spunbond-spunbond multilayer material. Or, the core may be a composite web comprising a nonwoven layer and a film layer.

"Meltblowing", as used herein, means a method for forming a nonwoven fibrous web by extruding a molten fiber-forming material through a plurality of orifices in a die to form fibers while contacting the fibers with air or other attenuating fluid to attenuate the fibers into fibers, and thereafter collecting the attenuated fibers. An exemplary meltblowing process is taught in, for example, U.S. Pat. No. 6,607,624 (Berrigan et al.). "Meltblown fibers" means fibers prepared by a meltblowing or meltblown process. "Spunbonding" and "spun bond process" mean a method for forming a nonwoven fibrous web by extruding molten fiber-forming material as continuous or semi-continuous fibers from a plurality of fine capillaries of a spinneret, and thereafter collecting the attenuated fibers. An exemplary spun-bonding process is disclosed in, for example, U.S. Pat. No. 3,802,817 to Matsuki et al. "Spun bond fibers" and "spun-bonded fibers" mean fibers made using spun-bonding or a spun bond process. Such fibers are generally continuous fibers and are entangled or point bonded sufficiently to form a cohesive nonwoven fibrous web such that it is usually not possible to remove one complete spun bond fiber from a mass of such fibers. The fibers may also have shapes such as those described, for example, in U.S. Pat. No. 5,277,976 to Hogle et al, which describes fibers with unconventional shapes. "Carding" and "carding process" mean a method of forming a nonwoven fibrous web webs by processing staple fibers through a combing or carding unit, which separates or breaks apart and aligns the staple fibers in the machine direction to form a generally machine direction oriented fibrous nonwoven web. Exemplary carding processes and carding machines are taught in, for example, U.S. Pat. No. 5,114,787 to Chaplin et al. and U.S. Pat. No. 5,643,397. "Bonded carded web" refers to nonwoven fibrous web formed by a carding process wherein at least a portion of the fibers are bonded together by methods that include for example, thermal point bonding, autogenous bonding, hot air bonding, ultrasonic bonding, needle punching, calendering, application of a spray adhesive, and the like. Further details regarding the production and characteristics of nonwoven webs and laminates including nonwoven webs may be found, for example, in U.S. Pat. No. 9,469,091 (Henke et al.), which is incorporated by reference in its entirety herein. "Air-laying" refers to a process in which bundles of small fibers having typical lengths ranging from about 3 to about 52 millimeters (mm) are separated and entrained in an air supply and then deposited onto a forming screen, usually with the assistance of a vacuum supply. The randomly oriented fibers may then be bonded to one another using, for example, thermal point bonding, autogenous bonding, hot air bonding, needle punching, calendering, a spray adhesive, and the like. An exemplary air-laying process is taught in, for example, U.S. Pat. No. 4,640,810 to Laursen et al. "Wet-laying" refers to a is a process in which bundles of small fibers having typical lengths ranging from about 3 to about 52 millimeters (mm) are separated and entrained in a liquid supply and then deposited onto a forming screen, usually with the assistance of a vacuum supply. Water is typically the preferred liquid. The randomly deposited fibers may by further entangled (e.g., hydro-entangled), or may be bonded to one another using, for example, thermal point bonding, autogenous bonding, hot air bonding, ultrasonic bonding, needle punching, calendering, application of a spray adhesive, and the like. An exemplary wet-laying and bonding process is taught in, for example, U.S. Pat. No.

5,167,765 to Nielsen et al. Exemplary bonding processes are also disclosed in, for example, U.S. Pat. No. 9,139,940 to Berrigan et al.

Fibrous materials that provide useful nonwoven cores may be made of natural fibers (e.g., wood or cotton fibers), synthetic fibers (e.g., thermoplastic fibers), metallic (e.g., copper) or combinations of natural, metallic and synthetic fibers. Exemplary materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The nonwoven substrate may be formed from fibers or filaments made of any suitable thermoplastic polymeric material. Suitable polymeric materials include, but are not limited to, polyolefins, poly(isoprenes), poly(butadienes), fluorinated polymers, chlorinated polymers, polyamides, polyimides, polyethers, poly(ether sulfones), poly(sulfones), poly(vinyl acetates), copolymers of vinyl acetate, such as poly(ethylene)-co-poly(vinyl alcohol), poly(phosphazenes), poly(vinyl esters), poly(vinyl ethers), poly(vinyl alcohols), and poly(carbonates). Suitable polyolefins include, but are not limited to, poly(ethylene), poly(propylene), poly(1-butene), copolymers of ethylene and propylene, alpha olefin copolymers (such as copolymers of ethylene or propylene with 1-butene, 1-hexene, 1-octene, and 1-decene), poly(ethylene-co-1-butene) and poly(ethylene-co-1-butene-co-1-hexene). Suitable fluorinated polymers include, but are not limited to, poly(vinyl fluoride), poly(vinylidene fluoride), copolymers of vinylidene fluoride (such as poly(vinylidene fluoride-co-hexafluoropropylene), and copolymers of chlorotrifluoroethylene (such as poly(ethylene-co-chlorotrifluoroethylene). Suitable polyamides include, but are not limited to: poly(iminoadipoyliminohexamethylene), poly(iminoadipoyliminodecamethylene), and polycaprolactam. Suitable polyimides include poly(pyromellitimide). Suitable poly(ether sulfones) include, but are not limited to, poly(diphenylether sulfone) and poly(diphenylsulfone-co-diphenylene oxide sulfone). Suitable copolymers of vinyl acetate include, but are not limited to, poly(ethylene-co-vinyl acetate) and such copolymers in which at least some of the acetate groups have been hydrolyzed to afford various poly(vinyl alcohols) including, poly(ethylene-co-vinyl alcohol).

The fibers may also be multi-component fibers, for example, having a core of one thermoplastic material and a sheath of another thermoplastic material. The sheath may melt at a lower temperature than the core, providing partial, random bonding between the fibers when the mat of fibers is exposed to a sheath melts. A combination of monocomponent fibers having different melting points may also be useful for this purpose. In some embodiments, the nonwoven fabric or web useful in the core according to the present disclosure is at least partially elastic. Examples of polymers for making elastic fibers include thermoplastic elastomers such as ABA block copolymers, polyurethane elastomers, polyolefin elastomers (e.g., metallocene poly olefin elastomers), olefin block copolymers, polyamide elastomers, ethylene vinyl acetate elastomers, and polyester elastomers. An ABA block copolymer elastomer generally is one where the A blocks are polystyrenic, and the B blocks are prepared from conjugated dienes (e.g., lower alkylene dienes). The A block is generally formed predominantly of substituted (e.g., alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. Other elastic polymers can be blended with block copolymer elastomers, and various elastic polymers may be blended to have varying degrees of elastic properties. Many types of thermoplastic elastomers are commercially available, including those from BASF, Florham Park, N.J., under the trade designation "STYROFLEX", from Kraton Polymers, Houston, Tex., under the trade designation "KRATON", from Dow Chemical, Midland, Mich., under the trade designation "PELLETHANE", "INFUSE", VERSIFY", or "NORDEL", from DSM, Heerlen, Netherlands, under the trade designation "ARNITEL", from E. I. duPont de Nemours and Company, Wilmington, Del., under the trade designation "HYTREL", from ExxonMobil, Irving, Tex. under the trade designation "VISTAMAXX", and more.

In other embodiments, the fibrous non-woven web may include thermally conductive fibers. The thermally conductive fibers for use in articles of the present disclosure are not particularly limited. Suitable materials of thermally conductive fibers include for instance and without limitation, copper, aluminum, steel, aluminum coated steel, iron, bronze, brass, nickel, chromium, gold, platinum, silver, palladium, rhodium, iridium, ruthenium, osmium, carbon, graphite, aluminum oxide, silicon carbide, boron nitride, ultrahigh molecular weight polyethylene, metal coated polymer fibers, thermally conductive particle filled polymer fibers, or combinations thereof. Typically, the thermally conductive fiber has a thermal conductivity of 5 W/mK or greater. In some embodiments, the thermally conductive fibers are metallic.

The nonwoven webs can be made from a breadth of fiber types including blends of polymeric and inorganic fibers to control the thermal conductivity and mechanical properties of the web. Optionally, the pad further comprises a plurality of second fibers entangled with the thermally conductive fibers. In some embodiments, the thermally conductive fibers are metallic (e.g., copper, aluminum, steel, nickel, silver, or metal coated polymer fibers) and the second fibers are polymeric or ceramic. Suitable polymeric fibers include for instance and without limitation, at least one of polyolefin fibers (e.g., polyethyelene or polypropylene), polyester fibers, or polyamide fibers. Further, phenolic (e.g., thermoset) fibers may be suitable polymeric fibers, may be potentially useful as a stiffening and/or springback additive for thermally conductive articles that will be subject to high levels of compression. Further details regarding non-woven webs made from thermally conductive fibers may be found, for example, in International Publication No. WO2021/176290 (Podkaminer et al.)

The fibrous non-woven web can be made by carded, air laid, wet laid, spunlaced, spunbonding, electrospinning or melt-blowing techniques, such as melt-spun or melt-blown, or combinations thereof. Any of the non-woven webs may be made from a single type of fiber or two or more fibers that differ in the type of thermoplastic polymer, shape, and/or thickness; the single fiber type or at least one of the multiple fiber types may each be a multicomponent fiber as described above.

Staple fibers may also be present in the web. The presence of staple fibers generally provides a loftier, less dense web than a web of only melt blown microfibers. A loftier web may have reduced cohesive strength at the core interface or the in bulk of the core itself, leading to easier separation from one or more adhesive layers.

The nonwoven article may optionally further comprise one or more layers of scrim. For example, either or both major surfaces may each optionally further comprise a scrim layer. The scrim, which is typically a woven or nonwoven reinforcement made from fibers, is included to provide strength to the nonwoven article. Suitable scrim materials include, but are not limited to, nylon, polyester, fiberglass, polyethylene, polypropylene, and the like. The average thickness of the scrim can vary. The layer of the scrim may optionally be bonded to the nonwoven substrate. A variety of adhesive materials can be used to bond the scrim to the substrate. Alternatively, the scrim may be heat-bonded to the nonwoven.

Useful nonwoven cores may have any suitable EFD, basis weight or thickness that is desired for a particular application. "Effective Fiber Diameter" or "EFD" is the apparent diameter of the fibers in a fiber web based on an air permeation test in which air at 1 atmosphere and room temperature is passed through a web sample at a specified thickness and face velocity (typically 5.3 cm/sec), and the corresponding pressure drop is measured. Based on the measured pressure drop, the Effective Fiber Diameter is calculated as set forth in Davies, C. N., The Separation of Airborne Dust and Particulates, Institution of Mechanical Engineers, London Proceedings, IB (1952). The fibers of the nonwoven substrate typically have an effective fiber diameter of from at least 0.1, 1, 2, or even 4 micrometers and at most 125, 75, 50, 35, 25, 20, 15, 10, 8, or even 6 micrometers. Spunbond cores typically have an EFD of no greater than 35, while air-laid cores may have a larger EFD on the order of 100 microns. The nonwoven core preferably has a basis weight in the range of at least 10, 20, or even 50 g/m$^2$; and at most 400, 200, or even 100 g/m$^2$. Basis weight is calculated from the weight of a 10 cm×10 cm sample. The minimum tensile strength of the nonwoven web is about 4.0 Newtons in the machine direction. For embodiments featuring a membrane at least partially infused with an adhesive composition, a larger EFD (e.g., at least 45) available in an air-laid or bonded carded web may be desirable in certain circumstances. Without wishing to be bound by theory, the larger EFD and attendant high loft can allow for improved penetration of the adhesive through the membrane.

The loft of core nonwovens can also be characterized in terms of Solidity (as defined herein and as measured by methods reported herein). Solidity is determined by dividing the measured bulk density of a nonwoven fibrous web by the density of the materials making up the solid portion of the web. Bulk density of a web can be determined by first measuring the weight (e.g., of a 10-cm-by-10-cm section) of a web. Dividing the measured weight of the web by the web area provides the basis weight of the web, which is reported in g/m2. The thickness of the web can be measured by obtaining (e g., by die cutting) a 135 mm diameter disk of the web and measuring the web thickness with a 230 g weight of 100 mm diameter centered atop the web. The bulk density of the web is determined by dividing the basis weight of the web by the thickness of the web and is reported as g/m3. The Solidity is then determined by dividing the bulk density of the nonwoven fibrous web by the density of the material (e.g., polymer) comprising the solid filaments of the web. The density of a bulk polymer can be measured by standard means if the supplier does not specify the material density.

Loft is usually reported as 100% minus the Solidity (e.g., a Solidity of 7% equates to a loft of 93%). A higher loft is particularly advantageous in pattern embossed cores, as the adhesive can infiltrate and flow throughout the void volume with greater relative ease during the application of thermal energy and/or pressure. As such, it may be desirable to couple a high loft nonwoven core with a pattern embossing process to create the requisite arrays of recesses.

As disclosed herein, webs of Solidity from about 2.0% to less than 12.0% (i.e., of loft of from about 98.0% to greater than 88.0%) can be produced. In various embodiments, webs as disclosed herein comprise a Solidity of at most about 7.5%, at most about 7.0%, or at most about 6.5%. In further embodiments, webs as disclosed herein comprise a Solidity of at least about 5.0%, at least about 5.5%, or at least about 6.0%.

Exterior Adhesive Layer(s)

The adhesives used in the exterior adhesive constructions described herein can include any adhesive having the desired properties. The composition of the carrier adhesive(s) and the composition of the exterior adhesive(s) can be the same as one another or different from one another. Either or both of the carrier adhesive layer(s) and the exterior adhesive construction may include a single adhesive composition or multiple adhesive compositions. The adhesive used in the exterior adhesive construction can be a pressure sensitive adhesive as described above. In presently preferred implementations of the present disclosure, the adhesive used in the exterior adhesive layer includes one or more hydrocarbon block copolymers and a polar phenolic tackifier. The exterior adhesive composition typically includes comparatively less tackifier than the carrier adhesive composition.

In some other embodiments, the exterior adhesive layer(s) can include at least one of rubber, silicone, or acrylic based adhesives. In some embodiments, the exterior adhesive layer can include a pressure-sensitive adhesive (PSA). In some embodiments, the exterior adhesive can include tackified rubber adhesives, such as natural rubber; olefins; silicones, such as silicone polyureas or silicone block copolymers; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques; polyurethanes; silicone block copolymers; and combinations of the above. In presently preferred embodiments, the exterior adhesive includes at least one of a silicone polyurea and other silicone block copolymers.

Adhesive Assemblies

In some embodiments, the adhesive article further includes a tab. The tab is an area that can be easily accessed by the user to assist in or begin to release the assembly from the adherend. The removal tab can be tacky from the outermost adhesive layer or non-tacky by being covered by layers of stretch film, non-stretch film, release liner, or from detackified adhesive. The tab may be created by assembling all components of the article and using, for example, die-cutting, laser-cutting, or crimping methods to define the tab periphery.

In some embodiments, the adhesive article further includes one or more release liners. The release liner can be, for example, on either or both of the major surfaces of the adhesive layers. The release liner protects the adhesive during manufacturing, transit, and before use. When the user desires to use the adhesive article, the user can peel or remove the release liner to expose the adhesive. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048, and incorporated herein. Preferred release liners are fluoroalkyl silicone polycoated paper. The release liners can be printed with lines, brand indicia, or other information.

In some embodiments, the adhesive assemblies of the present disclosure can be removed from a substrate or surface without damage. In particularly advantageous embodiments, the adhesive assemblies can be removed from at least one of painted drywall and wallpaper without damage.

Adhesive assemblies of the present disclosure have excellent shear strength. Some embodiments of the present disclosure have a shear strength of greater than 1600 minutes as measured according to ASTM D3654-82. Some embodiments of the present disclosure have shear strength of greater than 10,000 minutes as measured according to ASTM D3654-82. Some other embodiments of the present disclosure have shear strength of greater than 100,000 minutes as measured according to ASTM D3654-82.

Some adhesive assemblies of the present disclosure demonstrate improved weight bearing capacity, holding a 2.5 lbs weight for at least 14 days according to the Weight Hanging test. In presently preferred embodiments, the adhesive assemblies of the present disclosure demonstrate improved weight bearing capacity, holding a 2.5 lbs weight for at least 30 days according to the Weight Hanging test.

The Weight Hanging Test may be performed by applying adhesive assemblies to a 1.25 inch by 1.35 inch injection molded polycarbonate hooks, each hook having a thickness of 30 mils by hand under moderate pressure (roughly 5 pounds) for 5 seconds. The hook and adhesive assembly can then be applied to a test adherend by hand under moderate pressure (roughly 5 pounds for 5 seconds) such that the hook is positioned to allow for the hanging of weights. Typically, the tested adherend is a drywall panel painted with Behr Premium Plus Ultra. Flat Egyptian. Nile Paint & Primer in One Interior Paint (Behr Process Corporation, Santa Ana, CA). A plastic bag containing steel shot of a desired mass can be suspended from the hook immediately after application to the adherend. Samples are then observed after 1, 24, 48, and 72 hours of hanging and failures can be recorded at each time point. Samples should be tested in 3 replicates where possible. The performance value is an average of the hang time for all replicates of a given example such that the maximum performance value would be 72 hours and the minimum would be 0 hours.

Some adhesive assemblies of the present disclosure have an elongation at break of greater than 50% in at least one direction. Some adhesive assemblies of the present disclosure have an elongation at break of between about 50% and about 1200% in at least one direction.

In some embodiments, the adhesive assemblies of the present disclosure exhibit enhanced conformability to a substrate or surface than prior art adhesive assemblies. In some embodiments, the adhesive assemblies of the present disclosure hold more weight when adhered or attached to a substrate or surface than prior art adhesive mounting assemblies. In some embodiments, the adhesive assemblies of the present disclosure hold more weight for a longer period of time when adhered or attached to a substrate or surface than prior art adhesive mounting assemblies. In some embodiments, the adhesive assemblies of the present disclosure remain adhered to a textured, rough, or irregular surface for a longer period of time than prior art adhesive mounting assemblies. In some embodiments, the adhesive assemblies of the present disclosure hold a higher amount of weight when adhered to a textured, rough, or irregular surface than prior art adhesive mounting assemblies.

Adhesive assemblies of the present disclosure can advantageously provide enhanced weight bearing capability with a reduction or elimination of substrate damage on removal. Accordingly, presently preferred embodiments of the present disclosure demonstrate effective weight bearing capacity, a stronger adhesion per square inch of available adhesive area, and peel-removability from a painted drywall substrate without damage.

Hardgoods

Some embodiments further include a hardgood or mounting device. Exemplary hardgoods or mounting devices include, for example, hooks, knobs, clips, and loops. In some embodiments, the hardgood resembles a nail. In some embodiments, the hardgood has a single outward projection to act as a hanging surface. In some embodiments, the hardgood has multiple outward projections to act as a hanging surface. In some embodiments, the hardgood has is molded into a shape that can hold one or more items within such as but not limited to a box or caddy. In some embodiments, the hardgood is a shelf, ledge, or rack. In some embodiments, the hardgood is a bar wherein the bar can be straight or curved or substantially a ring wherein the bar can be mounted parallel or normal to the substrate surface. In some embodiments, the hardgood uses multiple methods for mounting or hanging items. Any of the following mounting devices can be used with the adhesive article of the present disclosure: U.S. Pat. No. 5,409,189 (Luhmann), U.S. Pat. No. 5,989,708 (Kreckel), U.S. Pat. No. 8,708,305 (McGreevy), U.S. Pat. No. 5,507,464 (Hamerski et al.), U.S. Pat. No. 5,967,474 (doCanto et al.), U.S. Pat. No. 6,082,686 (Schumann), U.S. Pat. No. 6,131,864 (Schumann), U.S. Pat. No. 6,811,126 (Johansson, et al.), U.S. Pat. No. D665,653, U.S. Pat. No. D876935, and U.S. Pat. No. 7,028,958 (Pitzen, et al.), all of which are incorporated by reference in their entirety herein. The hardgood may be any object to be mounted to a substrate.

In some embodiments, the hardgood is mounted to the substrate in one or more places wherein one or more of the mounting locations contain an adhesive article described in this invention. In some embodiments, the hardgood is mounted using a combination of removable article(s) and conventional mechanical fasteners including but not limited to nails, screws, bolts, and rivets.

In some embodiments, the hardgood is made from of thermoplastic polymers. In some embodiments, the hardgood is made from thermoset polymers. In some embodiments, the hardgood is made using polyolefin materials. In some embodiments, the hardgood is made using polycarbonate materials. In some embodiments, the hardgood is made using high-impact polystyrene. In some embodiments, the hardgood is made using acrylonitrile-butadiene-styrene (ABS) terpolymers. In some embodiments, the hardgood is made using two or more polymeric materials. In some embodiments, the hardgood is made from metal. In some embodiments, the hardgood is made from stainless steel. In some embodiments, the metal is painted, glazed, stained, brushed, or coated to alter its appearance. In some embodiments the hardgood is made from ceramic. In some embodiments, the hardgood is made from glazed ceramic. In some embodiments, the hardgood is made from unglazed ceramic. In some embodiments, the hardgood is comprised of naturally-based materials such as wood, bamboo, particle board, cloth, canvas, or derived from biological sources, and the like. In some embodiments, the naturally-based materials may be painted, glazed, stained, or coated to change their appearance. In some embodiments, the hardgood is made using two or more materials from the list above. In some embodiments, the hardgood is made from two pieces that are reversibly or irreversibly attached, joined, or welded together.

In some embodiments, the hardgood comprises two pieces wherein the first piece acts as a mounting surface for attaching the adhesive article to a substrate, and the second piece acts as a hanging member which may be used for hanging or mounting objects to the substrate. The two pieces may be reversibly attached using mechanical fasteners, hook and loop materials, or an additional adhesive layer.

The hardgood can be made using any method known in the art.

In some embodiments, the carrier may be attached to the hardgood using a lamination process. In some embodiments, the carrier may be attached to the hardgood using multiple lamination processes.

In some embodiments, the carrier may be attached to the hardgood using two or more injection molding steps in using one or more molds.

In some embodiments, the adhesive assembly may be attached to a hardgood manually by an end user.

Method of Making the Adhesive Assemblies Described Herein

The adhesive assemblies described herein can be made in various ways. The carrier and exterior constructions may be formed simultaneously or in discrete steps. For instance, the carrier may be formed separately from the exterior adhesive construction(s) and subsequently laminated thereto. In another instance, the core of an exterior adhesive construction may be laminated to a carrier and subsequently consolidated (i.e., welded or embossed.) In yet another instance, the The carrier of the composite adhesive assembly can be prepared using a variety of common methods for preparing adhesives. For example, the carrier adhesive composition can be coated onto a release liner, coated directly onto a carrier backing, or formed as a separate layer (e.g., coated onto a release liner) and then laminated to a backing. In some embodiments, a carrier adhesive can be formed simultaneously with the backing. For example, a multilayer film consisting of at least two layers, at least one of which is an adhesive, can be coextruded. In some embodiments, the construction can be formed in a cast or blown film construction.

To improve adhesion of a carrier adhesive composition to a carrier backing, the backing can be pretreated prior to applying, e.g., coating or laminating, the adhesive composition on the backing. Examples of suitable treatments include corona discharge, plasma discharge, flame treatment, electron beam irradiation, ultraviolet (UV) radiation, acid etching, chemical priming and combinations thereof. The treatment can optionally be performed with a reactive chemical adhesion promoter including, e.g., hydroxyethylacrylate, or hydroxyethyl methacrylate, or another reactive species of low molecular weight.

The exterior adhesive constructions, at least those including consolidated nonwovens, can be created according to the welding or embossing methods described above. The adhesive composition for the exterior adhesive construction can be disposed on the core in any known way, including, for example, the pressure sensitive adhesive composition can be coated onto a release liner, coated directly onto a core, or formed as a separate layer (e.g., coated onto a release liner) and then laminated to a core. An adhesive can be deposited onto a core with a known deposition method, including, e.g., solvent coating methods, water-borne coating methods, or hot melt coating methods, e.g., knife coating, roll coating, reverse roll coating, gravure coating, wire wound rod coating, slot orifice coating, slot die coating, extrusion coating, or the like.

The core may be selectively consolidated, thinned, or densified using methods described above. The core may be consolidated (e.g., condensed) before, during, or after the adhesive has been disposed on one or both major surfaces. In presently preferred implementations, the consolidation occurs as (i.e., simultaneously or near simultaneously) the adhesive is being been deposited.

In certain implementations, the core is selectively consolidated (i.e., an arranged pattern of recesses is created) using ultrasonic welding. In ultrasonic welding (sometimes referred to as "acoustic welding" or "sonic welding"), two parts to be joined are placed proximate a tool called an ultrasonic "horn" for delivering vibratory energy. These parts (or "workpieces") are constrained between the horn and an anvil. Oftentimes, the horn is positioned vertically above the workpiece and the anvil. The horn vibrates, typically at 20,000 Hz to 40,000 Hz, transferring energy, typically in the form of frictional heat, under pressure, to the parts. Due to the frictional heat and pressure, a portion of at least one of the parts softens or is melted, thus joining the parts or creating an embossed pattern on the part transferred from either the horn or the anvil.

During the welding process, an alternating current (AC) signal is supplied to a horn stack, which includes a converter, booster, and horn. The converter (also referred to as a "transducer") receives the AC signal and responds thereto by compressing and expanding at a frequency equal to that of the AC signal. Therefore, acoustic waves travel through the converter to the booster. As the acoustic wavefront propagates through the booster, it is amplified, and is received by the horn. Finally, the wavefront propagates through the horn, and is imparted upon the workpieces, thereby welding them together or creating an embossed pattern on the part, as previously described.

Another type of ultrasonic welding is "continuous ultrasonic welding". This type of ultrasonic welding is typically used for sealing fabrics and films, or other "web" workpieces, which can be fed through the welding apparatus in a generally continuous manner. In continuous welding, the ultrasonic horn is typically stationary and the part to be welded is moved beneath it. One type of continuous ultrasonic welding uses a rotationally fixed bar horn and a rotating anvil. The workpiece is fed between the bar horn and the anvil. The horn typically extends longitudinally towards the workpiece and the vibrations travel axially along the horn into the workpiece. In another type of continuous ultrasonic welding, the horn is a rotary type, which is cylindrical and rotates about a longitudinal axis. The input vibration is in the axial direction of the horn and the output vibration is in the radial direction of the horn. The horn is placed close to an anvil, which typically is also able to rotate so that the workpiece to be welded passes between the cylindrical surfaces at a linear velocity, which substantially equals the tangential velocity of the cylindrical surfaces. Ultrasonic welding systems are described in U.S. Pat. Nos. 5,976,316 and 7,690,548, each incorporated by reference in their entirety herein.

In other presently preferred implementations, the core is consolidated by pattern embossing. In general, the core is passed through a metal roll that is patterned (e.g., engraved) with raised and depressed areas corresponding to the desired arrangement of recesses, and a solid back-up roll, generally formed of metal or rubber. However, the core can also be fed between two patterned rolls displaying corresponding or alternating engraved areas, as described in U.S. Pat. No. 5,256,231 (Gorman et al.). In either case, it is typical to supply heat to one or more of the rolls so that the core is thermally bonded along the points of pattern contact.

In a presently preferred embodiment, the fibrous webs according to the present invention are thermally embossed with a pattern roll and a patterned back-up roll. In general, the temperature must be such that the fibers of the core are thermally fused at the points of contact without fracturing, or otherwise seriously weakening the core below a useable strength level. In this regard, it is typical to maintain the temperature of the pattern rolls between about 70° C. and 220° C., or between about 85° C. and 180° C. The pattern rolls may be maintained at the same or different temperatures. In addition, the pattern rolls typically contact the nonwoven sheet material at a pressure of from about 17 N/mm to about 150 N/mm, or about 35 N/mm to about 90 N/mm.

In another aspect, the present disclosure provides a method for creating an adhesive article in a core material already possessing a first arranged pattern of intrusive features. First, a core material including a first arranged pattern of recesses and two major surfaces is provided. Next, an adhesive can be deposited onto one or both major surfaces of the core. The orientation and character of the arranged pattern relative to the surface can be modified between or amongst first and second patterns. For example, the second pattern may consist of channels or recesses having larger dimensions than those elements of the first pattern.

The use of two or more arranged patterns can provide certain advantages to adhesive assemblies of the present disclosure. For instance, a first arranged pattern may be selected to improve the shear holding capability of the article. A second arranged pattern, different from the first pattern, can be selected to improve the performance during peel (e.g., damage reduction and peel force). In one exemplary embodiment, the first arranged pattern comprises discrete circular recesses, and a second pattern includes a plurality of channels extending across the major surfaces of the core.

Discrete adhesive assemblies can be formed from a continuous web of core or adhesive laminated core by a cutting process such as, for example, laser cutting, die cutting, stamping, crimping, or a combination thereof.

If the exterior adhesive construction and carrier are independently manufactured, the two components may then be laminated together via nip roll. In general, the carrier and exterior adhesive construction(s) are passed through a rubber or metal roll that is patterned (e.g., engraved). In this regard, it is typical to maintain the temperature of the roll between about 72° C. and 350° C., or between about 85° C. and 300° C. In addition, the roll typically contacts the components at a pressure of from about 17 N/mm to about 150 N/mm, or about 35 N/mm to about 90 N/mm.

Without wishing to be bound by theory, a lamination temperature above 150° C. can improve the interfacial adhesion between the carrier and the consolidated nonwoven, leading to enhanced load bearing capabilities. In particular, a lamination temperature above about 230° C. can lead to an adhesive assembly that holds 2.5 lbs for over 14 days according to the Weight Hanging Test above.

Methods of Using the Adhesive Assemblies Described Herein

The peelable assemblies of the present disclosure can be used in various ways. In some embodiments, the adhesive assembly is applied, attached to, or pressed into an adherend. In this way, the adhesive article contacts the adherend. Where a release liner is present, the release liner is removed before the adhesive article is applied, attached to, or pressed into an adherend. In some embodiments, at least a portion of the adherend is wiped with alcohol before the adhesive article is applied, attached to, or pressed into an adherend.

To remove the adhesive assembly from the adherend, at least a portion of the adhesive article is peeled or stretched away from the adherend. In some embodiments, the angle of stretch is 35° or less. In embodiments where a tab is present, the user can grip the tab and use it to release or remove the adhesive article from the adherend.

The adhesive assemblies can be used in isolation, as one of many assemblies attached to a surface, or as part of a stack of adhesive assemblies. In the latter implementation, the resulting construction would include a plurality of adhesive assemblies disposed in vertical relation to one another.

Uses

The adhesive assemblies may be used in wet or high humidity environments such as those found in bathrooms. For example, they can be adhered to toilets (e.g., toilet tanks), bathtubs, sinks, and walls. The adhesive article may be used in showers, locker rooms, steam rooms, pools, hot tubs, and kitchens (e.g., kitchen sinks, dishwashers and back splash areas, refrigerators and coolers). The adhesive assemblies may also be used in low temperatures applications including outdoor applications and refrigerators. Useful outdoor applications include bonding assemblies such as signage to outdoor surfaces such as windows, doors and vehicles.

The adhesive assemblies may be used to mount various items and objects to surfaces such as painted drywall, plaster, concrete, glass, ceramic, fiberglass, metal or plastic. Items that can be mounted include, but are not limited to, hooks and other hardgoods, wall hangings, organizers, holders, baskets, containers, decorations (e.g., holiday decorations), calendars, posters, dispensers, wire clips, body side molding on vehicles, carrying handles, signage applications such as road signs, vehicle markings, transportation markings, and reflective sheeting.

The adhesive assemblies may be used to mount items and materials, such as anti-slip mats or anti-fatigue mats, to a floor surface or the bottom of a tub or shower, or to secure items, such as area rugs, to a floor. The adhesive assembly can be used in various joining and assembling applications including such as adhering at least two containers (e.g., boxes) for later separation. The adhesive assembly can be used in various cushioning and sound deadening applications such as, for example, cushioning materials for placement beneath objects, sound insulating sheet materials, vibration dampening, and combinations thereof. The adhesive assembly can be used in various closure applications including container closures (e.g., box closures, closures for food containers, and closures for beverage containers), diaper closures, and surgical drape closures. The adhesive assembly can be used in various thermal insulation applications. The adhesive assembly can be used in various sealing applications such as in gaskets for liquids, vapors (e.g., moisture), and dust. The adhesive assembly can be used in various labels such as removable labels (e.g., notes, price tags, and identification labels on containers), and in signage. The adhesive assembly can be used in various medical applications (e.g., bandages, wound care, and medical device labeling such as in a hospital setting). The adhesive assembly can be used in various fastening applications such as fastening one object (e.g., a vase or other fragile object) to another object (e.g., a table or a book shelf). The adhesive assembly can be used in various securing applications such as fastening one or more components of a locking mechanism to a substrate (e.g., a child safety lock can be adhered to a cabinet or cupboard). The adhesive assemblies can be used in various tamper indicating applications (e.g., tamper indicating assemblies). The adhesive assemblies can also be incorporated in a variety of other constructions including, but not limited to, abrasive assemblies (e.g., for sanding), assemblies for sanding and polishing applications (e.g., buffing pads, disc pads, hand pads, and polishing pads), pavement marking assemblies, carpeting (e.g., backing for carpeting), and electronic devices (e.g., securing a battery within a housing in a cell phone or PDA (personal digital assistant) to prevent unwanted movement).

The adhesive assemblies can be provided in any useful form including, e.g., tape, strip, sheet (e.g., perforated sheet), label, roll, web, disc, and kit (e.g., an object for mounting and the adhesive tape used to mount the object). Likewise, multiple adhesive assemblies can be provided in any suitable form including, e.g., tape, strip, sheet (e.g., perforated sheet), label, roll, web, disc, kit, stack, tablet, and combinations thereof in any suitable package including, for example, dispenser, bag, box, and carton. The adhesive assemblies are particularly well suited to being provided in roll form, as the size of the active adhesive areas can be essentially unlimited.

Adhesive assemblies can also be initially repositionable and may even be reusable in some core iterations until one of the adhesive layers loses tack. As used herein, "repositionable" means an adhesive article that can be applied to a substrate and then removed and reapplied without distorting, defacing, or destroying the adhesive article, or substrate.

The following examples describe some exemplary constructions and methods of constructing various embodiments within the scope of the present application. The following examples are intended to be illustrative, but the particular materials and amounts thereof recited in these examples, as well as other conditions and details, should not be construed to unduly limit this disclosure.

EXAMPLES

TABLE 1

Material and supplier information

| | Material | Description | Supplier |
|---|---|---|---|
| Core | REEMAY 2024 | Spunbond Polyethylene terephthalate nonwoven | Berry Global, Evansville, IN |
| | REEMAY 2100 | Spunbond Polyethylene terephthalate nonwoven | Berry Global, Evansville, IN |
| | REEMAY 2004 | Spunbond Polyethylene terephthalate nonwoven | Berry Global, Evansville, IN |
| Carrier | Foam 1 | Polyolefin foam composite | 3M Company, St. Paul, MN |
| | Foam 2 | Neoprene foam | McMaster-Carr, Elmhurst, IL |
| | Paper 1 | Copy paper | International Paper, Memphis, TN |
| | PE film | Linear low density polyethylene film | Berry Global, Evansville, IN |
| | PET film | Polyethylene terephthalate film | 3M Company, St. Paul, MN |
| | Denim fabric | 100% cotton | Carr Textile by Amazon |
| Adhesive | Rubber 1 | Tackified, rubber-based pressure-sensitive adhesive | 3M Company, St. Paul, MN |
| | Rubber 2 | Tackified, rubber-based pressure-sensitive adhesive | 3M Company, St. Paul, MN |
| | Silicone 1 | Tackified, silicone-based pressure-sensitive adhesive | 3M Company, St. Paul, MN |
| Adhesive/ Nonwoven/ Adhesive Composite | COMMAND ADJUSTABLES strip | Peelable, repositionable, damage-free removal strip | 3M Company, St. Paul, MN |

Materials

Core

REEMAY 2024, 2100, and 2004 were obtained from Berry Global and used as received. They all were spunbond polyethylene terephthalate webs with varying basis weights: 71 grams per square meter (gsm) for REEMAY 2024, 33 gsm for REEMAY 2100, and 14 gsm for REEMAY 2004.

Carrier

Foam 1 was a polyolefin-based, heat-laminated, film-foam-film composite like that found on 3M COMMAND adhesive strip products. The films were 1.8 mils thick linear low density polyethylene (LLDPE) film obtained from Berry Plastics (Evansville, IN). The foam was 31 mils thick, 6 pounds per cubic feet density, ethyl vinyl acetate foam obtained from Voltek (Division of Sekisui America Corporation, Lawrence, MA).

Foam 2 was a black neoprene foam, 0.0625 inch thick, 20 pounds per cubic feet density. It was obtained from McMaster-Carr and used as received.

Paper 1 was Hammermill Copy Plus, white paper, 75 grams per square meter, 0.004 inch thick. It was obtained from International Paper and used as received.

PE film was a primed 6 mils thick LLDPE film obtained from Berry Plastics (Evansville, IN).

PET film was an unprimed 5 mils thick Polyethylene terephthalate film.

Denim fabric was 100% cotton, indigo—dark unwashed, 400 grams per square meter, 0.030 inch thick. It was obtained from Can Textile (Fenton, MO) through Amazon com and used as received.

Adhesive

Pressure Sensitive Adhesive Compositions

Rubber 1: A pressure-sensitive adhesive composition was prepared having an 85:15 ratio of KRATON D1184 (Radial Styrene-Butadiene Block Copolymer (SBS), KRATON Performance Polymers, Inc., Houston, TX) to SOLPRENE 1205 (Styrene-Butadiene Rubber (SBR), Dynasol Elastomers, Houston, TX) as the elastomer component and 35 parts of total tackifier component (POLYSTER T160 (terpene phenolic resin, Yasuhara Chemical Company, Ltd., Fuchu-city, Hiroshima, Japan) based on 100 parts of total elastomer. All of the components were added to a glass jar along with toluene to make a solution of approximately 30% solids. The jar was sealed and the contents thoroughly mixed by placing the jar on a roller at about 2-6 rpm for at least 24 hours prior to coating.

Rubber 2: A pressure-sensitive adhesive composition was prepared having an 65:35 ratio of KRATON D1184 (Radial Styrene-Butadiene Block Copolymer (SBS), KRATON Performance Polymers, Inc., Houston, TX) to SOLPRENE 1205 (Styrene-Butadiene Rubber (SBR), Dynasol Elastomers, Houston, TX) as the elastomer component and 98 parts of PICCOLYTE A135 (polyterpene resin, Pinova Inc, Brunswick, GA) as the tackifier component based on 100 parts of total elastomer. All of the components were combined with toluene and thoroughly mixed to make a solution of approximately 40-43% solids.

Silicone 1: A silicone polyurea block copolymer based pressure-sensitive adhesive composition was prepared according to the method described for Example 28 in U.S. Pat. No. 6,569,521, except that the composition was prepared to have the weight % MQ resin amount of 50.

Preparation of Transfer Adhesives

All adhesive materials used to prepare the adhesive assemblies in the Examples were transfer adhesives with an exposed adhesive surface on one side and a liner on the opposite side.

Rubber 1: The pressure sensitive adhesive compositions above were knife-coated onto a paper liner web having a silicone release surface. The paper liner web speed was 2.75 meter/min. After coating, the web was passed through an oven 11 meters long (residence time 4 minutes total) having three temperature zones. The temperature in zone 1 (2.75 meter) was 57° C.; temperature in zone 2 (2.75 meter) was 71° C.; temperature in zone 3 (about 5.5 meter) was 82° C. The caliper of the dried adhesive was approximately 2.0 mils thick. Transfer adhesives were then stored at ambient conditions.

Rubber 2: The Rubber 2 transfer adhesives were prepared similarly to the Rubber 1 transfers adhesives except that caliper of the dried adhesive was approximately 2.0-3.0 mils thick.

Silicone 1: Pressure sensitive adhesive compositions were knife-coated onto a paper liner web having a silicone release surface. The paper liner web speed was 2.75 meter/min. After coating, the web was passed through an oven 11 meters long (residence time 4 minutes total) having three temperature zones. The temperature in zone 1 (2.75 meter) was 57° C.; temperature in zone 2 (2.75 meter) was 80° C.; temperature in zone 3 (about 5.5 meter) was 93° C. The caliper of the dried adhesive was approximately 2.5-3.0 mils thick. The transfer adhesives were then stored at ambient conditions.

Adhesive-Nonwoven-Adhesive Composite

COMMAND ADJUSTABLES strips were obtained from 3M Company and used as received. Each strip measured 1.00 inch by 1.3 inch and was an adhesive-nonwoven-adhesive composite having liners attached to both adhesive surfaces.

Adhesive Assembly Preparations

Embossing

In some cases, samples were prepared by hand laminating the exposed surface of exterior adhesive 1 and exterior adhesive 2, both of which were in the form of transfer adhesives, on opposite sides of a nonwoven sample of appropriate dimensions to create a liner-adhesive-nonwoven-adhesive-liner stack. In some other cases, samples were prepared by hand laminating the exposed surface of exterior adhesive 1, which was in the form of transfer adhesives, on one side of a nonwoven sample of appropriate dimensions to create a liner-adhesive-nonwoven stack. These different cases are specified further in the "Assembling" section below.

The stacks were then fed into the embossing station by hand and the adhesive assembly was embossed through the liner(s). The stacks were embossed by being passed through a metal roll that was patterned (e.g., engraved) with raised and depressed areas in an arranged pattern of hexagons (see FIG. 1) and a smooth metal roll of about 22 inches in width, in generally similar manner to the methods described, e.g., in U.S. Pat. No. 6,383,958 (Swanson et al) at 150 pounds per linear inch nip pressure, no gap between two rolls, 280°/270° F. patterned/smooth roll temperatures, and 5 feet per minute embossing speed.

Roll Laminating

Samples were prepared by hand laminating different layers of materials of appropriate dimensions to create a stack. The stack was then fed by hand into a roll laminating station (ChemInstruments HL Series Hot Roll Laminator, ChemInstruments, Fairfield, OH). The stack was roll laminated by being passed through two smooth rubber rolls at 40 psi nip pressure, no gap between two rolls, a laminating speed setting of 25 (approximately 5 feet per minute), and at various temperatures that are described further in the "Assembling" section below. For each sample, the stack was roll laminated twice.

Assembling

Each example generally required a different combination of embossing and/or roll laminating steps to assemble different materials into a final adhesive assembly, the order of which will be described separately below. If there were steps in addition to embossing or roll laminating, they will also be described therein. As described previously, exterior and carrier adhesives were in the form of transfer adhesives with exposed adhesive surface on one side and a liner on the opposite side.

Examples 1-22 and Comparative Examples CE1-CE3

The adhesive assembly constructions for Examples 1-22 and CE1-CE3 are summarized in Table 2.

Examples 1-5 were prepared by: a) embossing exterior adhesive 1 onto one side of nonwoven 1 of appropriate dimensions, b) hand laminating the exposed surface of carrier adhesive 1 and carrier adhesive 2 onto opposite sides of a carrier backing of appropriate dimensions and roll laminating this stack at 72° F., c) peeling off the liner attached to carrier adhesive 1 and hand laminating the nonwoven side without adhesive of the stack from step a) onto carrier adhesive 1, d) roll laminating the stack from step c) at 72° F. The final adhesive assembly for Examples 1-5 was a stack of liner-exterior adhesive 1-nonwoven 1-carrier adhesive 1-carrier backing-carrier adhesive 2-liner.

Examples 6-11 were prepared by: a) embossing exterior adhesive 1 onto one side of nonwoven 1 of appropriate dimensions, b) embossing exterior adhesive 2 onto one side of nonwoven 2 of appropriate dimensions, c) hand laminating the exposed surface of carrier adhesive 1 and carrier adhesive 2 onto opposite sides of a carrier backing of appropriate dimensions and roll laminating this stack at 72° F., d) peeling off the liner attached to carrier adhesive 1 and carrier adhesive 2 and hand laminating the nonwoven side without adhesive of the stacks from step a) and b) onto carrier adhesive 1 and carrier adhesive 2 respectively, e) roll laminating the stack from step d) at 72° F. The final adhesive assembly for Examples 16-11 was a stack of liner-exterior adhesive 1-nonwoven 1-carrier adhesive 1-carrier backing-carrier adhesive 2-nonwoven 2-exterior adhesive 2-liner.

Example 12 was prepared by: a) embossing exterior adhesive 1 onto one side of nonwoven 1 of appropriate dimensions, b) embossing exterior adhesive 2 onto one side of nonwoven 2 of appropriate dimensions, c) hand laminating the exposed surface of carrier adhesive 1 and carrier adhesive 2 of appropriate dimensions onto the nonwoven side without adhesive of the stacks from step a) and b) and roll laminating these stacks at 72° F., d) peeling off the liner attached to carrier adhesive 1 and carrier adhesive 2 and hand laminating the exposed surface of carrier adhesive 1 onto the exposed surface of carrier adhesive 2, e) roll laminating the stack from step d) at 72° F. The final adhesive assembly for Example 12 was a stack of liner-exterior adhesive 1-nonwoven 1-carrier adhesive 1-carrier adhesive 2-nonwoven 2-exterior adhesive 2-liner.

Example 13 was prepared by: a) embossing exterior adhesive 1 onto one side of nonwoven 1 of appropriate dimensions, b) embossing exterior adhesive 2 onto one side of nonwoven 2 of appropriate dimensions, c) corona treating the nonwoven side without adhesive of the stacks from step a) and b) using a hand-held corona treater, 1-pass top-bottom from left to right and 1 pass left-right top to bottom (Model BD-20 Laboratory Corona Treater, 115 V, 50/60 Hz, 0.35 A, Electro-Technic Products, Inc., Chicago, IL), d) hand laminating the exposed surface of carrier adhesive 1 & 2 of appropriate dimensions onto the nonwoven side without adhesive of the stacks from step c and roll laminating these stacks at 72° F., e) peeling off the liner attached to carrier adhesive 1 and carrier adhesive 2 and hand laminating the exposed surface of carrier adhesive 1 onto the exposed surface of carrier adhesive 2, f) roll laminating the stack from step e) at 72° F. The final adhesive assembly for Example 13 was a stack of liner-exterior adhesive 1-nonwoven 1-carrier adhesive 1-carrier adhesive 2-nonwoven 2-exterior adhesive 2-liner.

Example 14 was prepared by: a) embossing exterior adhesive 1 onto one side of nonwoven 1 of appropriate dimensions, b) embossing exterior adhesive 2 onto one side of nonwoven 2 of appropriate dimensions, c) hand laminating the exposed surface of carrier adhesive 1 and carrier adhesive 2 of appropriate dimensions onto the nonwoven side without adhesive of the stacks from step a) and b) and roll laminating these stacks at 120° F., d) peeling off the liner attached to carrier adhesive 1 and carrier adhesive 2 and hand laminating the exposed surface of carrier adhesive 1 onto the exposed surface of carrier adhesive 2, e) roll laminating the stack from step d) at 120° F. The final adhesive assembly for Example 14 was a stack of liner-exterior adhesive 1-nonwoven 1-carrier adhesive 1-carrier adhesive 2-nonwoven 2-exterior adhesive 2-liner.

Examples 15, 17, 18 were prepared by: a) embossing exterior adhesive 1 onto one side of nonwoven 1 of appropriate dimensions, b) embossing exterior adhesive 2 onto one side of nonwoven 2 of appropriate dimensions, c) hand laminating the exposed surface of carrier adhesive 1 and carrier adhesive 2 of appropriate dimensions onto the nonwoven side without adhesive of the stacks from step a) and b) and roll laminating these stacks at 230° F., d) peeling off the liner attached to carrier adhesive 1 and carrier adhesive 2 and hand laminating the exposed surface of carrier adhesive 1 onto the exposed surface of carrier adhesive 2, e) roll laminating the stack from step d) at 230° F. The final adhesive assembly for Examples 15, 17, 18 was a stack of liner-exterior adhesive 1-nonwoven 1-carrier adhesive 1-carrier adhesive 2-nonwoven 2-exterior adhesive 2-liner.

Example 16 was prepared by: a) hand laminating the exposed surface of carrier adhesive 1 and exterior adhesive 1 onto opposite sides of nonwoven 1 of appropriate dimensions and roll laminating this stack at 72° F., b) hand laminating the exposed surface of carrier adhesive 2 and exterior adhesive 2 onto opposite sides of nonwoven 2 of appropriate dimensions and roll laminating this stack at 72° F., c) peeling off the liners attached to carrier adhesive 1 and carrier adhesive 2 and hand laminating the exposed surface of carrier adhesive 1 onto the exposed surface of carrier adhesive 2, d) roll laminating the stack from step c) at 72° F., e) embossing the stack from step d). The final adhesive assembly for Example 16 was a stack of liner-exterior adhesive 1-nonwoven 1-carrier adhesive 1-carrier adhesive 2-nonwoven 2-exterior adhesive 2-liner.

Example 19 was prepared by: a) hand laminating one side of nonwoven 1 and one side of nonwoven 2 onto opposite sides of a carrier backing of appropriate dimensions and roll laminating this stack at 230° F., b) embossing exterior adhesive 1 and exterior adhesive 2 of appropriate dimensions onto the stack from step a). The final adhesive assembly for Example 19 was a stack of liner-exterior adhesive 1-nonwoven 1-carrier backing-nonwoven 2-exterior adhesive 2-liner.

Example 20 was prepared by: a) peeling off the liners attached to one side of two identical COMMAND ADJUSTABLES strips, b) hand laminating the exposed adhesive surfaces of the two strips from step a) onto one another and roll laminating the stack at 72° F. The final adhesive assembly for Example 20 was a stack of liner-COMMAND ADJUSTABLES strip-COMMAND ADJUSTABLES strip-liner.

Example 21 was prepared by: a) peeling off the liners attached to one side of two identical COMMAND ADJUSTABLES strips, b) hand laminating the exposed surface of carrier adhesive 1 and carrier adhesive 2 onto the exposed adhesive surfaces of the two strips from step a) and roll laminating each strip separately c) peeling off the liners attached to carrier adhesive 1 and carrier adhesive 2 and hand laminating the exposed surface of carrier adhesive 1 onto the exposed surface of carrier adhesive 2, d) roll laminating the stack at 72° F. The final adhesive assembly for Example 21 was a stack of liner-COMMAND ADJUSTABLES strip-carrier adhesive 1-carrier adhesive 2-COMMAND ADJUSTABLES strip-liner.

Example 22 was prepared by: a) hand laminating the exposed surface of carrier adhesive 1 and carrier adhesive 2 onto opposite sides of a carrier backing of appropriate dimensions and roll laminating this stack at 72° F., b) peeling off the liner attached to one side of COMMAND ADJUSTABLES strip and peeling off the liner attached to carrier adhesive 1 and hand laminating the exposed adhesive surface of COMMAND ADJUSTABLES strip onto the exposed surface of carrier adhesive 1, and c) roll laminating the stack at 72° F. The final adhesive assembly for Example 22 was a stack of liner-COMMAND ADJUSTABLES strip-carrier adhesive 1-carrier backing-carrier adhesive 2-liner.

Comparative Examples CE1-CE3 were prepared by hand laminating the exposed surface of exterior adhesive 1 and carrier adhesive 2 onto a nonwoven sample of appropriate dimensions and roll laminating the stack at 230° F. The final adhesive assembly for Comparative Examples CE1-CE3 was a stack of liner-exterior adhesive 1-nonwoven-exterior adhesive 2-liner.

Test Methods

Test Adherends

Drywall panels (obtained from Materials Company, Metzger Building, St. Paul, MN) were painted with Sherwin-Williams DURATION Interior Acrylic Latex Ben Bone White Paint (Sherwin-Williams Company, Cleveland, OH) for weight hanging tests. A first coat of paint was applied to a panel by paint roller, followed by air drying for approximately 1 hour at ambient conditions. A second coat of paint was applied and dried at ambient conditions for at least 7 days before use. Approximately 1 hour before the Repositionable, Damage-free Removal, and Weight-hanging tests (set out below) were performed on drywall panels, they were wiped with rubbing alcohol and let dry.

Repositionable, Damage-Free Removal, and Weight Hanging Test

The liner on exterior adhesive 2 or carrier adhesive 2 was peeled off from adhesive assembly and the exposed adhesive surface was applied to a 1.0 inch wide by 1.3 inch long injection molded polycarbonate hook having a thickness of approximately 38 mils, by hand under moderate pressure (roughly 5 pounds) for 5 seconds. The hook was the same as the 3M COMMAND ADJUSTABLES Repositionable ½ Pound Clip product (3M Company, St. Paul, MN) and having the shape depicted in U.S. patent D876935. The liner on exterior adhesive 1 was peeled off from the adhesive assembly and the combined hook and adhesive assembly was applied to the adherend with a pressure applicator under 23.5 pounds pressure for 5 seconds. The combined hook and adhesive assembly was removed and reapplied with the pressure applicator under 23.5 pounds pressure for 5 seconds to a separate section of the adherend. This removal and reapplication process was repeated two more times within 20 minutes. Damage-free removal was subsequently evaluated under the following metric: 0-no damage, 1-small paint bubble (less than 10% of surface area), 2-large paint bubble (greater than 10% of surface area), 3-small paper tear (less than 10% of surface area), 4-Paper tear/damage (less than 50% of surface area), 5-Paper tear damage (greater than 50% of surface area). If any adhesive remained on the adherend, it was removed by hand before evaluating damage level. Thereafter, a 2.5 pounds steel weight was hung in the final hook position for up to 30 days. In some cases the hook remained in position for more than 30 days, including up to one year. Samples were observed every 1 to 3 days of hanging and failures were recorded at each time point. The performance value was an average of the hang time in days for all replicates of a given example. All samples were tested in 6 replicates. Unlike the other examples, Example 2 was tested with a different hook design. The hook was the same as the 3M COMMAND Medium Wire Toggle Hook product (3M Company, St. Paul, MN) and having the shape depicted in U.S. patent USD670997. Test data is provided in Table 3.

TABLE 2

Examples 1-22 and Comparative Examples CE1-CE3: Adhesive Assembly Constructions

| | 1st adhesive | | Carrier | | | 2nd adhesive | |
|---|---|---|---|---|---|---|---|
| Example | Exterior Adhesive 1 | Nonwoven 1 | Carrier adhesive 1 | Carrier Backing | Carrier Adhesive 2 | Nonwoven 2 | Exterior Adhesive 2 |
| 1 | Rubber 1 | REEMAY 2100 | Rubber 2 | Paper 1 | Rubber 2 | N/A | N/A |
| 2 | Rubber 1 | REEMAY 2100 | Rubber 2 | Foam 1 | Rubber 2 | N/A | N/A |
| 3 | Rubber 1 | REEMAY 2100 | Rubber 2 | PET film | Rubber 2 | N/A | N/A |
| 4 | Rubber 1 | REEMAY 2100 | Rubber 2 | PE film | Rubber 2 | N/A | N/A |
| 5 | Rubber 1 | REEMAY 2100 | Rubber 2 | Denim fabric | Rubber 2 | N/A | N/A |
| 6 | Rubber 1 | REEMAY 2100 | Rubber 2 | Foam 1 | Rubber 2 | REEMAY 2100 | Rubber 1 |
| 7 | Rubber 1 | REEMAY 2100 | Rubber 2 | Foam 2 | Rubber 2 | REEMAY 2100 | Rubber 1 |
| 8 | Rubber 1 | REEMAY 2100 | Rubber 2 | Paper 1 | Rubber 2 | REEMAY 2100 | Rubber 1 |
| 9 | Rubber 1 | REEMAY 2024 | Rubber 2 | Paper 1 | Rubber 2 | REEMAY 2024 | Rubber 1 |
| 10 | Rubber 1 | REEMAY 2004 | Rubber 2 | Paper 1 | Rubber 2 | REEMAY 2004 | Rubber 1 |
| 11 | Rubber 1 | REEMAY 2100 | Rubber 1 | Paper 1 | Rubber 1 | REEMAY 2100 | Rubber 1 |
| 12 | Rubber 1 | REEMAY 2100 | Rubber 2 | N/A | Rubber 2 | REEMAY 2100 | Rubber 1 |

TABLE 2-continued

Examples 1-22 and Comparative Examples CE1-CE3: Adhesive Assembly Constructions

| | Adhesive Assembly | | | | | | |
|---|---|---|---|---|---|---|---|
| | 1st adhesive | | Carrier | | | 2nd adhesive | |
| Example | Exterior Adhesive 1 | Nonwoven 1 | Carrier adhesive 1 | Carrier Backing | Carrier Adhesive 2 | Nonwoven 2 | Exterior Adhesive 2 |
| 13 | Rubber 1 | REEMAY 2100 | Rubber 2 | N/A | Rubber 2 | REEMAY 2100 | Rubber 1 |
| 14 | Rubber 1 | REEMAY 2100 | Rubber 2 | N/A | Rubber 2 | REEMAY 2100 | Rubber 1 |
| 15 | Rubber 1 | REEMAY 2100 | Rubber 2 | N/A | Rubber 2 | REEMAY 2100 | Rubber 1 |
| 16 | Rubber 1 | REEMAY 2100 | Rubber 2 | N/A | Rubber 2 | REEMAY 2100 | Rubber 1 |
| 17 | Rubber 1 | REEMAY 2100 | Rubber 1 | N/A | Rubber 1 | REEMAY 2100 | Rubber 1 |
| 18 | Rubber 1 | REEMAY 2100 | Silicone 1 | N/A | Silicone 1 | REEMAY 2100 | Rubber 1 |
| 19 | Rubber 1 | REEMAY 2100 | N/A | PE film | N/A | REEMAY 2100 | Rubber 1 |
| 20 | COMMAND ADJUSTABLES Strip | N/A | N/A | N/A | N/A | COMMAND ADJUSTABLES Strip | |
| 21 | COMMAND ADJUSTABLES Strip | Rubber 2 | N/A | Rubber 2 | COMMAND ADJUSTABLES Strip | | |
| 22 | COMMAND ADJUSTABLES Strip | Rubber 2 | Foam 1 | Rubber 2 | N/A | N/A | |
| CE1 | Rubber 1 | | | REEMAY 2004 | | | Rubber 1 |
| CE2 | Rubber 2 | | | REEMAY 2004 | | | Rubber 2 |
| CE3 | Silicone 1 | | | REEMAY 2004 | | | Silicone 1 |

TABLE 3

Examples 1-22 and Comparative Examples CE1-CE3: Repositionable, Damage-free Removal, Weight Hanging Test Results

| | Test Results | | |
|---|---|---|---|
| Example | Repositionable | Damage-Free Removal (Average visual rating) | Weight Hanging (Days) |
| 1 | Yes | 0 | >30 |
| 2 | Yes | 0 | >30 |
| 3 | Yes | 0 | >30 |
| 4 | Yes | 0 | >30 |
| 5 | Yes | 0 | >30 |
| 6 | Yes | 0 | 12 |
| 7 | Yes | 0 | 12 |
| 8 | Yes | 0 | 12 |
| 9 | Yes | 0 | 6 |
| 10 | Yes | 2.17 | N/A (didn't hang weight due to damage) |
| 11 | Yes | 0 | 6 |
| 12 | Yes | 0 | 11 |
| 13 | Yes | 0 | 25 |
| 14 | Yes | 0 | 17 |
| 15 | Yes | 0 | >30 |
| 16 | Yes | 0 | 9 |
| 17 | Yes | 0 | 7 |
| 18 | Yes | 0 | >30 |
| 19 | Yes | 0 | 11 |
| 20 | Yes | 0 | 4 |
| 21 | Yes | 0 | 16 |
| 22 | Yes | 0 | >30 |
| CE1 | Yes | 3.67 | N/A (didn't hang weight due to damage) |
| CE2 | Yes | 4.67 | N/A (didn't hang weight due to damage) |
| CE3 | Yes | 4.17 | N/A (didn't hang weight due to damage) |

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

We claim:

1. An adhesive assembly for mounting an object to a surface, the assembly comprising: a first adhesive construction including a first major surface and a second major surface, the first adhesive construction including a first adhesive layer; a first core adjacent the first adhesive layer, the core comprising core material and including first and second major surfaces; and a first arranged pattern of recesses on at least the first major surface of the first core, each recess terminating in a membrane, wherein the membrane is defined by a bottom surface of the recess and comprises core material; and a first adhesive interface at the bottom surface or within the membrane; and a stiffening carrier laminated to the second major surface of the first adhesive construction, the stiffening carrier having a higher stiffness than the first adhesive construction.

2. The adhesive assembly of claim 1, wherein the carrier comprises a carrier backing including opposing major surfaces.

3. The adhesive assembly of claim 2, wherein the carrier further includes a first carrier adhesive layer on a first major surface of the carrier backing.

4. The adhesive assembly of claim 3, wherein the carrier further includes a second carrier adhesive layer on a second major surface of the carrier backing opposite the first carrier adhesive layer.

5. The adhesive assembly of claim 1, wherein the first core comprises a non-woven material.

6. The adhesive assembly of claim 1, wherein the material of the first core has a void volume, and wherein the void volume of the first membrane is substantially less than a void volume of the core material in the interstitial spaces between adjacent recesses.

7. The adhesive assembly of claim 1, wherein the membranes reside in one more planes substantially parallel to a plane coincident with the first major surface.

8. The adhesive assembly of claim 2, wherein the carrier backing comprises a layer of foam, film, paper or combinations thereof.

9. The adhesive assembly of claim 8, wherein the carrier backing layer is a laminate of a foam and film.

10. The adhesive assembly of claim 9, wherein the carrier backing layer includes a film-foam-film laminate.

11. The adhesive assembly of claim 2, wherein the carrier backing consists of a carrier adhesive layer.

12. The adhesive assembly of claim 1, further comprising a second adhesive construction adjacent the second major surface of the carrier, the second adhesive construction including opposing major surfaces the second adhesive construction including a second adhesive layer; a second core adjacent the second adhesive layer, the second core comprising core material and including opposing major surfaces; and a second arranged pattern of recesses on at least the second major surface of the second core, each recess terminating in a membrane, wherein the membrane is defined by the bottom surface of the recess and comprises core material; and a second adhesive interface at the bottom surface or within the membrane.

13. The adhesive assembly of claim 1, wherein the first carrier adhesive layer is a tackified acrylic or synthetic rubber pressure sensitive adhesive.

14. An adhesive assembly for mounting an object to a surface, the assembly comprising:

a first exterior adhesive construction including a first major surface and a second major surface, the first adhesive construction including a first adhesive layer; a first core adjacent the first adhesive layer, the core comprising core material and including first and second major surfaces; and a first arranged pattern of recesses on at least the first major surface of the first core, each recess terminating in a membrane, wherein the membrane is defined by the bottom surface of the recess and comprises core material; and a first adhesive interface at the bottom surface or within the membrane;

a carrier including a first carrier adhesive layer, a second carrier adhesive layer, and a backing layer including opposing major surfaces, the first carrier adhesive layer laminated to the second major surface of the first adhesive construction and the first major surface of the backing layer; and a second exterior adhesive construction adjacent the second major surface of the carrier, the second adhesive construction including opposing major surfaces the second adhesive construction including a second adhesive layer; a second core adjacent the second adhesive layer, the second core comprising core material and including opposing major surfaces; and a second arranged pattern of recesses on at least the second major surface of the second core, each recess terminating in a membrane, wherein the membrane is defined by the bottom surface of the recess and comprises core material; and a second adhesive interface at the bottom surface or within the membrane, wherein the first and second exterior adhesive constructions reside on opposing sides of the carrier.

* * * * *